US011091613B2

(12) United States Patent
Cain et al.

(10) Patent No.: US 11,091,613 B2
(45) Date of Patent: Aug. 17, 2021

(54) MICROSTRUCTURE-CONTROLLED COPOLYMERS OF ETHYLENE AND $C_3$-$C_{10}$ ALPHA-OLEFINS

(71) Applicant: Afton Chemical Corporation, Richmond, VA (US)

(72) Inventors: Nathaniel Cain, Richmond, VA (US); John Loper, Henrico, VA (US); Lawrence Cunningham, Mechanicsville, VA (US); Joseph W. Roos, Mechanicsville, VA (US)

(73) Assignee: AFTON CHEMICAL CORPORATION, Richmond, VA (US)

( * ) Notice: Subject to any disclaimer, the term of this patent is extended or adjusted under 35 U.S.C. 154(b) by 378 days.

(21) Appl. No.: 16/271,419

(22) Filed: Feb. 8, 2019

(65) Prior Publication Data

US 2019/0169334 A1 Jun. 6, 2019

Related U.S. Application Data

(63) Continuation of application No. 15/377,152, filed on Dec. 13, 2016, now Pat. No. 10,221,267.

(51) Int. Cl.
*C08F 10/06* (2006.01)
*C08F 10/02* (2006.01)
(Continued)

(52) U.S. Cl.
CPC .......... *C08L 23/0815* (2013.01); *C08F 10/02* (2013.01); *C08F 10/06* (2013.01);
(Continued)

(58) Field of Classification Search
CPC ........ C08F 10/06; C08F 10/02; C08F 210/16; C08F 2500/29
See application file for complete search history.

(56) References Cited

U.S. PATENT DOCUMENTS 2,098,869 A 11/1937 Harmon et al.
2,840,551 A 6/1958 Field et al.
(Continued)

FOREIGN PATENT DOCUMENTS

CN 1346398 A 4/2002
CN 101379170 A 3/2009
(Continued)

OTHER PUBLICATIONS

Non-Final Office Action for U.S. Appl. No. 16/006,401; dated Sep. 20, 2019 (10 pages).
(Continued)

*Primary Examiner* — Catherine S Branch
(74) *Attorney, Agent, or Firm* — Mendelsohn Dunleavy, P.C.

(57) ABSTRACT

A copolymer including ethylene units and units of one or more $C_{3-10}$ alpha-olefins. The copolymer has a number average molecular weight of less than 5,000 g/mol, as measured by GPC. The ethylene content of the copolymer is less than 80 mol %. At least 70% of molecules of the copolymer have an unsaturated group, and at least 70% of said unsaturated groups are located in a terminal vinylidene group or a tri-substituted isomer of a terminal vinylidene group. The copolymer has a crossover temperature of –20° C. or lower and/or a certain ethylene run length. Also disclosed are a method for making the copolymer and polyolefins plasticized with 1-40 wt % of the copolymer.

19 Claims, 6 Drawing Sheets

(51) Int. Cl.

| | | |
|---|---|---|
| *C08F 210/00* | (2006.01) | |
| *C08F 210/16* | (2006.01) | |
| *C08L 23/08* | (2006.01) | |
| *C08F 110/00* | (2006.01) | |
| *C08K 3/22* | (2006.01) | |
| *C08K 3/38* | (2006.01) | |
| *C08F 4/659* | (2006.01) | |

(52) U.S. Cl.
CPC .......... *C08F 110/00* (2013.01); *C08F 210/00* (2013.01); *C08F 210/16* (2013.01); *C08K 3/22* (2013.01); *C08K 3/38* (2013.01); *B01J 2231/20* (2013.01); *C08F 4/65908* (2013.01); *C08F 4/65912* (2013.01); *C08F 2500/02* (2013.01); *C08F 2800/10* (2013.01); *C08K 2003/2227* (2013.01); *C08K 2003/2244* (2013.01)

(56) References Cited

U.S. PATENT DOCUMENTS

| | | |
|---|---|---|
| 3,149,178 A | 9/1964 | Hamilton et al. |
| 3,160,672 A | 12/1964 | Pearson et al. |
| 3,166,536 A | 1/1965 | Witt et al. |
| 3,201,364 A | 8/1965 | Salyer |
| 3,215,707 A | 11/1965 | Rense |
| 3,778,371 A | 12/1973 | Malec |
| 4,132,698 A | 1/1979 | Gessler et al. |
| 4,171,959 A | 10/1979 | Vartanian |
| 4,234,435 A | 11/1980 | Meinhardt et al. |
| 4,253,980 A | 3/1981 | Hammond et al. |
| 4,326,973 A | 4/1982 | Hammond et al. |
| 4,338,206 A | 7/1982 | Hammond et al. |
| 4,365,105 A | 12/1982 | Morganson et al. |
| 4,436,948 A | 3/1984 | Bobsein |
| 4,507,515 A | 3/1985 | Johnston et al. |
| 4,536,537 A | 8/1985 | Klingensmith et al. |
| 4,645,791 A | 2/1987 | Theodore et al. |
| 4,827,064 A | 5/1989 | Wu |
| 4,827,073 A | 5/1989 | Wu |
| 4,960,820 A | 10/1990 | Hwo |
| 5,128,056 A | 7/1992 | Gutierrez et al. |
| 5,171,908 A | 12/1992 | Rudnick |
| 5,225,092 A | 7/1993 | Emert et al. |
| 5,254,138 A | 10/1993 | Kurek |
| 5,266,223 A | 11/1993 | Song et al. |
| 5,285,851 A | 2/1994 | Pringle |
| 5,334,321 A | 8/1994 | Harrison et al. |
| 5,433,875 A | 7/1995 | Rollin et al. |
| 5,498,809 A | 3/1996 | Emert et al. |
| 5,525,128 A | 6/1996 | McAleer et al. |
| 5,608,029 A | 3/1997 | Thaler et al. |
| 5,616,153 A | 4/1997 | Mike et al. |
| 5,811,379 A | 9/1998 | Rossi et al. |
| 5,936,041 A | 8/1999 | Diana et al. |
| 6,017,859 A | 1/2000 | Rossi et al. |
| 6,066,603 A | 5/2000 | Emert et al. |
| 6,100,224 A | 8/2000 | Peiffer et al. |
| 6,509,288 B1 | 1/2003 | Dorer et al. |
| 6,589,920 B2 | 7/2003 | Okada et al. |
| 6,639,020 B1 | 10/2003 | Brant |
| 6,858,767 B1 | 2/2005 | DiMaio et al. |
| 6,916,882 B2 | 7/2005 | Brant |
| 7,129,306 B2 | 10/2006 | DiMaio |
| 7,897,696 B2 | 3/2011 | Huang et al. |
| 7,973,001 B2 | 7/2011 | Fujita et al. |
| 8,071,835 B2 | 12/2011 | Wu et al. |
| 8,147,569 B2 | 4/2012 | Barton et al. |
| 8,193,135 B2 | 6/2012 | Tanaglia |
| 8,614,277 B2 | 12/2013 | Kiss et al. |
| 9,441,063 B2 | 9/2016 | Cruz et al. |
| 10,190,070 B2 | 1/2019 | Goldblatt et al. |
| 2002/0193647 A1 | 12/2002 | Heilman et al. |
| 2004/0054040 A1 | 3/2004 | Liu et al. |
| 2004/0106723 A1 | 6/2004 | Yang et al. |
| 2004/0168364 A1 | 9/2004 | Macduff et al. |
| 2006/0148990 A1 | 7/2006 | Burrowes et al. |
| 2008/0021159 A1 | 1/2008 | Abraham et al. |
| 2008/0182768 A1 | 7/2008 | Devlin et al. |
| 2009/0143261 A1 | 6/2009 | Takeoka et al. |
| 2012/0101017 A1 | 4/2012 | Duggal |
| 2012/0117859 A1 | 5/2012 | Skursha et al. |
| 2014/0087985 A1 | 3/2014 | Patil et al. |
| 2016/0257862 A1 | 9/2016 | Yoshimoto et al. |
| 2017/0335228 A1 | 11/2017 | Campbell et al. |

FOREIGN PATENT DOCUMENTS

| | | |
|---|---|---|
| CN | 105112139 A | 12/2015 |
| EP | 223394 A1 | 10/1985 |
| EP | 0200351 A2 | 11/1985 |
| EP | 0300689 A3 | 1/1989 |
| EP | 0315363 A2 | 5/1989 |
| EP | 0336545 A1 | 10/1989 |
| EP | 0440508 A2 | 8/1991 |
| EP | 0453088 A1 | 10/1991 |
| EP | 0647700 B1 | 11/1999 |
| FR | 2669640 A1 | 5/1992 |
| JP | 56095938 A | 8/1981 |
| JP | H02-99598 A | 4/1990 |
| JP | 07292167 A | 11/1995 |
| RU | 2425063 C2 | 7/2011 |
| WO | WO90/01503 A1 | 2/1990 |
| WO | WO9533781 A1 | 12/1992 |
| WO | WO 9419436 A2 | 9/1994 |
| WO | WO9844041 A1 | 10/1998 |
| WO | WO0118109 A1 | 3/2001 |
| WO | WO0218487 A1 | 3/2002 |
| WO | WO0231044 A1 | 4/2002 |
| WO | WO03020856 A1 | 3/2003 |
| WO | WO03040095 A2 | 5/2003 |
| WO | WO03040201 A1 | 5/2003 |
| WO | WO03040202 A2 | 5/2003 |
| WO | WO03040233 A2 | 5/2003 |
| WO | WO03040442 A1 | 5/2003 |
| WO | WO03048252 A1 | 6/2003 |
| WO | WO2004014997 A1 | 2/2004 |
| WO | WO2004014998 A3 | 2/2004 |
| WO | WO2007011459 A1 | 1/2007 |
| WO | WO2007011462 A1 | 1/2007 |
| WO | WO2007011973 A1 | 1/2007 |
| WO | WO2009020706 A1 | 2/2009 |

OTHER PUBLICATIONS

Non-Final Office Action for U.S. Appl. No. 15/904,324; dated Aug. 1, 2019, (10 pages).
Communication pursuant to Article 94(3) EPC; dated Feb. 21, 2019 for EP Application No. 17206857.9.
International Search Report and Written Opinion; dated Feb. 28, 2019 for PCT Application No. PCT/US2018/061178.
Non-Final Office Action; dated Mar. 26, 2019 for U.S. Appl. No. 15/377,788.
International Search Report and Written Opinion; dated Mar. 27, 2019 for PCT Application No. PCT/US2018/065096.
Communication pursuant to Article 94(3) EPC; for corresponding European application No. 17206850.4; dated Dec. 12, 2019 (7 pages).
Notice of Grounds for Rejection for Korean application No. 10-2019-7020393; dated Feb. 25, 2020 (6 pages).
Final Office Action for U.S. Appl. No. 16/006,258; dated Feb. 20, 2020 (8 pages).
Official Action for Russian application No. 2019121910; dated Apr. 21, 2020 (10 pages).
Notice of Rejection for Japanese application No. 2019-530708; dated Mar. 10, 2020 (4 pages).
First Office Action for Chinese application No. 201780084470.2; dated Mar. 24, 2020 (11 pages).
European Office Action; dated Mar. 8, 2019 for EP Application No. 17 206 850.4.

(56) References Cited

OTHER PUBLICATIONS

Non-Final Office Action for U.S. Appl. No. 16/006,258; dated Sep. 25, 2019 (11 pages).
Immergut, E., et al., "Principles of Plasticization," In Plasticization and Plasticizer Processes; Advances in Chemistry, American Chemical Society: Washington, DC, 1965; pp. 1-26.
Huang, Qigu, et al. "Synthesis and characterization of oligomer from 1-decene catalyzed by supported Ziegler—Natta catalyst." European polymer journal 41.12 (2005): 2909-2915.
Small, P. A. "Some factors affecting the solubility of polymers." Journal of Applied Chemistry 3.2 (1953): 71-80.
Schneier, Bernard. "An equation for calculating the solubility parameter of random copolymers." Journal of Polymer Science Part B: Polymer Letters 10.4 (1972): 245-251.
Fedors, R.F., "A Method for Estimating Both the Solubility Parameters and Molar Volumes of Liquids," Pol. Eng. Sci., 14, 147-154 (1974).
Forte, Giuseppe, and Sara Ronca. "Synthesis of disentangled Ultra-High Molecular Weight Polyethylene: influence of reaction medium on material properties." International Journal of Polymer Science 2017 (2017).
Hansen, Redford, & Øysæd. (1996). Improvement in the determination of triad distributions in ethylene-propylene aopolymers by 13C nuclear magnetic resonance. Polymer, 37(1), 19-24.
Randall, James C. "A review of high resolution liquid 13carbon nuclear magnetic resonance characterizations of ethylene-based polymers." Journal of Macromolecular Science—Reviews in Macromolecular Chemistry and Physics 29.2-3 (1989): 201-317.
International Search Report and Written Opinion; dated Mar. 7, 2018 for PCT Application No. PCT/US2017/065767.
European Search Report; dated Mar. 9, 2018 for EP Application No. 17206857.9.
European Search Report; dated Mar. 6, 2018 for EP Application No. 17206850.4.
International Search Report and Written Opinion; dated Mar. 6, 2018 for PCT Application No. PCT/US2017/065773.

MICROSTRUCTURE-CONTROLLED COPOLYMERS OF ETHYLENE AND $C_3$-$C_{10}$ ALPHA-OLEFINS

BACKGROUND OF THE INVENTION

The present invention relates to poly(alpha-olefin) plasticizers and plasticized polymers comprising such poly(alpha-olefin) plasticizers.

Polyolefins are used for making a wide variety of products. However, one drawback of some polyolefins is their relatively high glass transition temperature ($T_g$). Polypropylene homopolymers and copolymers are particularly problematic in this respect. This high $T_g$ may result in materials that are difficult to process and which may be brittle, especially at low temperatures. Also, for many products, high molecular weight polyolefins are required to provide the desired polymer properties. High molecular weight polyolefins can be even more difficult to process, due to their high melt viscosities.

As a result, there is a need to provide polymers with good processability that are also able to maintain their advantageous properties over time when exposed to a wide temperature range. One important property for such polymers is low-temperature toughness which should be improved while still providing a polymer that maintains its properties upon exposure to elevated temperatures over time.

Addition of a plasticizer to a polyolefin is known to improve properties such as impact strength and processability. Such plasticizers are often used to lower the $T_g$ of the polymer. Lowering the $T_g$ of the polymer can improve the processability and low temperature impact toughness of the polymer and reduce the tendency of the polymer to become brittle at low temperatures. In order to achieve this combination of advantages, the plasticizer should have the ability to maintain its viscosity at low temperature. Some plasticizers have a tendency to crystallize or form structure in the plasticizer at low temperatures leading to an undesirable increase in viscosity of the plasticizer. This may result in an adverse impact on the low temperature impact toughness of a polymer plasticized with this plasticizer by causing the polymer to become brittle.

Many plasticized polymers also suffer from problems such as blooming or diffusion of plasticizer to the surface of the polymer, or even volatilization of the plasticizer from the polymer, each resulting in long-term deterioration of polymer properties. As a result, plasticizers are sought which have a relatively low pour point and thus can impart the advantageous lowering of the $T_g$ of the polymer discussed above while at the same time ensuring that the polymer retains its advantageous properties over time, particularly when exposed to high temperatures. In order to achieve this, the volatility or tendency of the plasticizer to diffuse to the surface of the polymer must be balanced with the lowering of the Tg of the polymer. One way to reduce the volatility of the plasticizer is to increase its number average molecular weight. However, increasing the number average molecular weight can have an adverse influence on the Tg of the plasticized polymer and the processability of the polymer.

Plasticizers having lower number-average molecular weights ($M_n$) tend to be better at lowering the $T_g$ of the polymer since the $T_g$ of the polymer tends to be inversely proportional to the $M_n$ of the plasticizer. However, as the number-average molecular weight ($M_n$) of the plasticizer decreases, the plasticization durability of the properties imparted by the plasticizer to the polymer is adversely affected, especially when exposed to high temperatures. This is at least partially due to the increased tendency of the plasticizer to migrate to the surface of the polymer and/or volatilize. Thus, improved plasticizers are sought that have the ability to lower the $T_g$ of a polymer without lowering the number average molecular weight of the plasticizer.

Another key aspect for selection of an appropriate plasticizer is the chemical compatibility of the plasticizer with the polymer. To achieve this goal, it is desirable to employ plasticizers that are chemically similar to the polymer that is being plasticized. This will enhance the chemical compatibility between the plasticizer and the polymer. For this purpose, polyalphaolefms (PAOs) have been proposed for use as polyolefin plasticizers.

Such PAOs are typically oligomers of olefins having five or more carbon atoms. In some cases, such oligomers with five or more carbon atoms may be copolymerized with ethylene to $C_4$ olefins to reduce the pour point of the plasticizer. US 2004/054040 and WO 2004/014997 disclose PAO plasticizers having a weight average molecular weight ($M_w$) in the range of 100 to 20,000 g/mol. and a kinematic viscosity at 100° C. ($KV_{100}$) of 0.1 to 3,000 cSt.

US 2004/106723 and WO 2004/014998 disclose plasticizers having a $KV_{100}$ of 10 cSt or more and a viscosity index (VI) of 100 or more. These plasticizers include oligomers of $C_5$ to $C_{14}$ olefins. U.S. Pat. No. 4,536,537 discloses PAO plasticizers having a kinematic viscosity at 38° C. of about 2 to 6 cSt. WO 98/044041, WO 2002/018487 and WO 2003/048252 disclose PAO plasticizers having a $KV_{100}$ of about 4 to 8 cSt.

WO 2009/020706 discloses plasticizers that are regularly branched PAO oligomers of one or more $C_2$-$C_{20}$ alpha-olefins having a $KV_{100}$ of 3 to 3,000 cSt, a branching irregularity index ('BII') of 0.40 or less, and a molar-average carbon number (CLAO) of 6 to 14. Preferably, the regularly branched PAOs have a Mw/Mn of less than 2.3. Polyolefins plasticized with the regularly branched PAOs are said to have a reduced volatility as measured by thermogravimetric analysis, compared to comparable polyolefin compositions plasticized with conventional PAOs, or a reduced glass transition temperature (Tg) of the composition compared to comparable polyolefin compositions plasticized with conventional PAOs.

PAO plasticizers are typically prepared by olefin isomerization which results in oligomers having a variety of different structures caused by, for example, irregular branching. According to the present invention, it has now been found that PAOs having certain characteristics indicative of their structure can provide an improved combination of plasticization efficiency and plasticization durability of the properties imparted by the plasticizers when used in polyolefins.

BRIEF SUMMARY OF THE INVENTION

The present invention generally relates to copolymers that include ethylene units and units of one or more $C_{3-10}$ alpha-olefins, wherein the copolymer has a number average molecular weight of less than 5,000 g/mol as measured by GPC; the ethylene content of the copolymer is less than 80 mol %; at least 70% of molecules of the copolymer have an unsaturated group, and at least 70% of said unsaturated groups are located in a terminal vinylidene group or a tri-substituted isomer of a terminal vinylidene group; and the copolymer has a crossover temperature of −20° C. or lower.

The foregoing copolymer may have an average ethylene unit run length ($n_{C2}$) which is less than 2.8 or less than 2.6, as determined by $^{13}$C NMR spectroscopy, and also satisfies the relationship shown by the expression below:

$$n_{C2} < \frac{(EEE + EEA + AEA)}{(AEA + 0.5EEA)}$$

wherein $EEE=(x_{C2})^3$, $EEA=2(x_{C2})^2(1-x_{C2})$, $AEA=x_{C2}(1-x_{C2})^2$, $x_{C2}$ being the mole fraction of ethylene incorporated in the polymer as measured by $^1$H-NMR spectroscopy, E representing an ethylene unit, and A representing an alpha-olefin unit.

The present invention also generally relates to copolymers that include ethylene units and units of one or more $C_{3-10}$ alpha-olefins, wherein the copolymer has a number average molecular weight of less than 5,000 g/mol as measured by GPC; the ethylene content of the copolymer is less than 80 mol %; at least 70% of molecules of the copolymer have an unsaturated group, and at least 70% of said unsaturated groups are located in a terminal vinylidene group or a tri-substituted isomer of a terminal vinylidene group; and the copolymer has an average ethylene unit run length ($n_{C2}$) which is less than 2.8 or less than 2.6, as determined by $^{13}$C NMR spectroscopy, and also satisfies the relationship shown by the expression below:

$$n_{C2} < \frac{(EEE + EEA + AEA)}{(AEA + 0.5EEA)}$$

wherein $EEE=(x_{C2})^3$, $EEA=2(x_{C2})^2(1-x_{C2})$, $AEA=x_{C2}(1-x_{C2})^2$, $x_{C2}$ being the mole fraction of ethylene incorporated in the polymer as measured by $^1$H-NMR spectroscopy, E representing an ethylene unit, and A representing an alpha-olefin unit. This copolymer may have a crossover temperature of −20° C. or lower.

In each of the foregoing embodiments, the ethylene content of the copolymer may be less than 70 mol %, or less than 65 mol %, or less than 60 mol %, or less than 55 mol %, or less than 50 mol %, or less than 45 mol %, or less than 40 mol %. In each of the foregoing embodiments, the ethylene content of the copolymer may be at least 10 mol % and less than 80 mol %, or at least 20 mol % and less than 70 mol %, or at least 30 mol % and less than 65 mol %, or at least 40 mol % and less than 60 mol %.

In each of the foregoing embodiments, the $C_3$-$C_{10}$ alpha-olefin content of the copolymer may be at least 20 mol %, or at least 30 mol %, or at least 35 mol %, or at least 40 mol %, or at least 45 mol %, or at least 50 mol %, or at least 55 mol %, or at least 60 mol %.

In each of the foregoing embodiments, at least 75 mol % of the copolymer may terminate in the terminal vinylidene group or the tri-substituted isomer of the terminal vinylidene group, or at least 80 mol % of the copolymer terminates in the terminal vinylidene group or the tri-substituted isomer of the terminal vinylidene group, or at least 85 mol % of the copolymer terminates in the terminal vinylidene group or the tri-substituted isomer of the terminal vinylidene group, or at least 90 mol % of the copolymer terminates in the terminal vinylidene group or the tri-substituted isomer of the terminal vinylidene group, or at least 95 mol % of the copolymer terminates in the terminal vinylidene group or the tri-substituted isomer of the terminal vinylidene group.

In each of the foregoing embodiments, the copolymer may have an average ethylene unit run length of less than 2.6, or less than 2.4, or less than 2.2, or less than 2.

In each of the foregoing embodiments, the crossover temperature of the copolymer may be −25° C. or lower, or −30° C. or lower, or −35° C. or lower, or −40° C. or lower.

In each of the foregoing embodiments, the copolymer may have a polydispersity index of less than or equal to 4, or less than or equal to 3, or less than or equal to 2.

In each of the foregoing embodiments, the $C_3$-$C_{10}$ alpha-olefin units may include propylene units.

In each of the foregoing embodiments, the number average molecular weight of the copolymer may be less than 4,000 g/mol, or less than 3,500 g/mol, or less than 3,000 g/mol, or less than 2,500 g/mol, or less than 2,000 g/mol, or less than 1,500 g/mol, or less than 1,000 g/mol. In each of the foregoing embodiments, the number average molecular weight of the copolymer may be between 800 and 3,000 g/mol.

In each of the foregoing embodiments, less than 20% of unit triads in the copolymer are ethylene-ethylene-ethylene triads, or less than 10% of unit triads in the copolymer are ethylene-ethylene-ethylene triads, or less than 5% of unit triads in the copolymer are ethylene-ethylene-ethylene triads.

DETAILED DESCRIPTION OF EMBODIMENTS OF THE INVENTION

Figure 1:
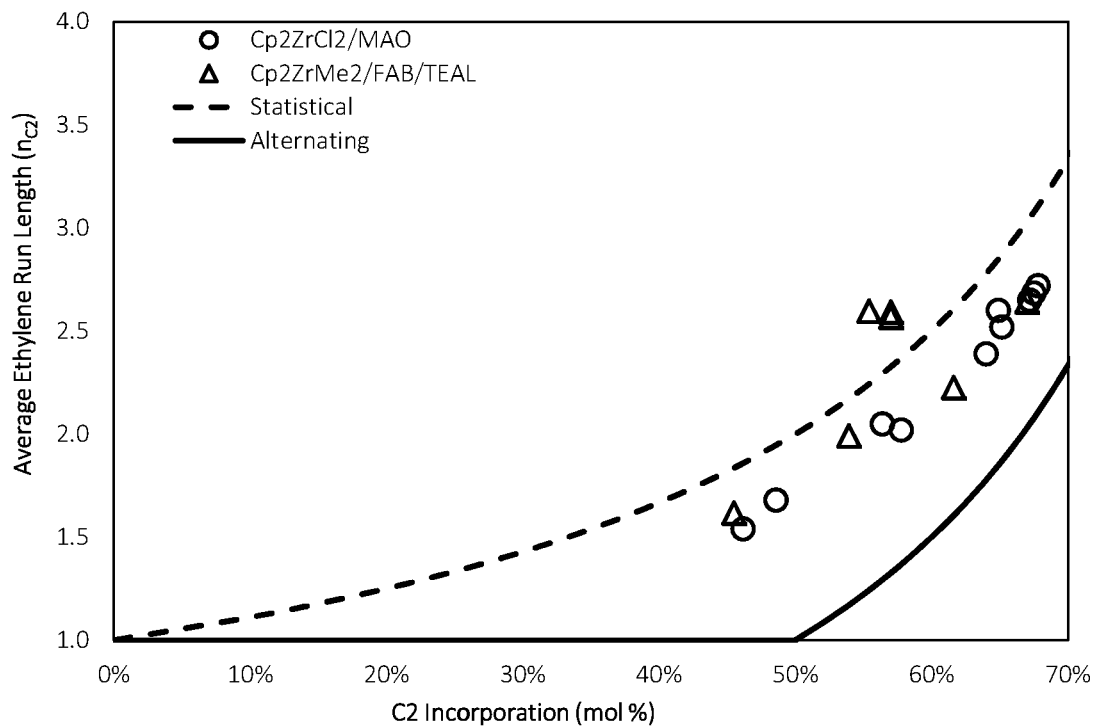
FIG. 1 is a graphical representation of the comparison of average ethylene unit run length to purely Statistical and Alternating microstructures at different ethylene incorporations for ethylene/C3 copolymers, according to one or more embodiments.

The present invention relates to ethylene-$C_3$-$C_{10}$ alpha-olefin copolymers and addition of such copolymers to one or more polyolefins in order to produce a blend with improved properties as compared to the unmodified polyolefin(s). Copolymers with certain characteristics may be employed to provide a better combination of properties in a plasticized polyolefin than conventional PAO plasticizers.

Various embodiments will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Definitions

The following definitions are made for purposes of this invention and the claims thereto.

When a polymer or copolymer is referred to as comprising an ethylene unit or an olefin unit, the ethylene or olefin unit present in the polymer or copolymer is the polymerized or oligomerized form of the ethylene or olefin, respectively. The term, "polymer" is meant to encompass homopolymers and copolymers. The term, "copolymer" includes any polymer having two or more units from different monomers in the same chain, and encompasses random copolymers, statistical copolymers, interpolymers, and block copolymers. When a copolymer is said to comprise a certain percentage of an ethylene or olefin unit, that percentage is based on the total amount of units in the copolymer components.

A "polyolefin" is a polymer comprising at least 50 mol % of one or more olefin monomers. Preferably, a polyolefin comprises at least 60 mol %, or at least 70 mol %, or at least 80 mol %, or at least 90 mol %, or at least 95 mol %, or 100 mol % of one or more olefin monomers. Preferably, the olefin monomers are selected from ethylene to ethylene$_0$ olefins, or ethylene to $C_{16}$ olefins, or ethylene to $C_{10}$ olefins. More preferably the olefin monomers are selected from ethylene, propylene, 1-butene, 1-hexene, and 1-octene. Polyolefins may also comprise up to 50 mol % of one or more diene monomers.

The nomenclature "$C_x$" where x is an integer means there are "x carbons" in the compound; for example, a "$C_5$ alpha-olefin" is an alpha-olefin with 5 carbon atoms.

For purpose of this invention and the claims thereto, unless otherwise noted, physical and chemical properties described herein are measured using the test methods described under the Experimental Methods section.

In one aspect, there is disclosed copolymers of ethylene and $C_3$-$C_{10}$ alpha-olefins that are suitable for use as plasticizers, particular for plasticizing polyolefins.

Ethylene/Alpha-Olefin Copolymers

The copolymers described herein contain a plurality of ethylene units and a plurality of one or more $C_3$-$C_{10}$ alpha-olefin units. Exemplary alpha-olefin units include propylene, butane, pentene, hexene, heptane, octene, nonene and decene units. Thus, the carbon number of each alpha-olefin unit may be 3, 4, 5, 6, 7, 8, 9, or 10. The alpha-olefin units may be derived from monomers such as, for example, propylene, 1-butene, 1-pentene, 1-hexene, 1-heptene, 1-octene, 1-nonene or 1-decene.

An ethylene unit generally refers to an —$CH_2CH_2$— unit within a copolymer chain. Ethylene units result from copolymerization of ethylene monomers. Alpha-olefin units generally refer to a unit such as the propylene unit —$CH_2CH_2CH_2$— and similarly result from copolymerization of alpha-olefin monomers. The term "olefin" is given its ordinary meaning in the art, e.g., referring to a family of organic compounds which are alkenes having the chemical formula $C_xH_{2x}$, where x is the carbon number, and wherein the alkenes have a double bond within their structure. The term "alpha-olefin" is given its ordinary meaning in the art and refers to olefins having a double bond within their structure at the primary or alpha position.

The Crossover Temperature

One important characteristic of the copolymer described herein is the crossover temperature or onset temperature of the copolymer. The copolymer is generally viscoelastic; in other words, its mechanical properties are between those of a purely elastic solid and those of a purely viscous liquid. The viscoelastic behavior of the copolymer may be characterized as the combination of an elastic portion (referred to as either an elastic modulus or a storage modulus), and a viscous portion (referred to as either a viscous modulus or a loss modulus). The values of these moduli are used to characterize the viscoelastic properties of the copolymer at a given temperature. Both the storage modulus and the loss modulus are dependent on temperature, although each may change at a different rate as a function of temperature. Thus, the copolymer may exhibit more elasticity or more viscosity, depending on the temperature. The crossover temperature is defined herein as the temperature at which the storage modulus equals the loss modulus. The crossover temperature may also be referred to as the onset temperature.

Oscillatory rheology is a technique that may be used to determine values (generally expressed in units of pressure) for the storage modulus and loss modulus. The basic principle of an oscillatory rheometer is to induce a sinusoidal shear deformation in the sample (e.g., a sample of copolymer) and measure the resultant stress response. In a typical experiment, the sample is placed between two plates. While the top plate remains stationary, a motor rotates the bottom plate, thereby imposing a time dependent strain on the sample. Simultaneously, the time dependent stress is quantified by measuring the torque that the sample imposes on the top plate.

Measuring this time dependent stress response reveals characteristics about the behavior of the material. If the material is an ideal elastic solid, then the sample stress is proportional to the strain deformation, and the proportionality constant is the shear modulus of the material. In this case, the stress is always exactly in phase with the applied sinusoidal strain deformation. In contrast, if the material is a purely viscous fluid, the stress in the sample is proportional to the rate of strain deformation, where the proportionality constant is the viscosity of the fluid. In this case, the applied strain and the measured stress are out of phase.

Viscoelastic materials show a response that contains both in-phase and out-of-phase contributions. These contributions reveal the extents of solid-like and liquid-like behavior. A viscoelastic material will show a phase shift with respect to the applied strain deformation that lies between that of solids and liquids. These can be decoupled into an elastic component (the storage modulus) and a viscosity component (the loss modulus). The viscoelastic behavior of the system can thus be characterized by the storage modulus and the loss modulus, which respectively characterize the solid-like and fluid-like contributions to the measured stress response.

As mentioned above, the values of the storage modulus and loss modulus are temperature dependent. At warmer temperatures, the value of the loss modulus for the copolymer is greater than the value of the storage modulus. However, as the temperature decreases, the copolymer may behave more like an elastic solid, and the degree of contribution from the storage modulus approaches that from the loss modulus. As the temperature lowers, eventually, at a certain temperature the storage modulus of the copolymer crosses over the loss modulus and becomes the predominant contributor to the viscoelastic behavior of the copolymer. According to one or more embodiments, a lower crossover temperature of the copolymer correlates to better low temperature performance of oils into which the copolymer is incorporated.

According to one or more embodiments, the copolymer may have a crossover temperature of −20° C. or lower, −25° C. or lower, −30° C. or lower, −35° C. or lower, −40° C. or lower, −50° C. or lower, −60° C. or lower, or −70° C. or lower as determined by oscillatory rheometry. Other values are also possible. An advantageous crossover temperature for the copolymer may be achieved through controlling characteristics of the copolymer during its manufacture. One such characteristic is the average ethylene unit run length in the copolymer.

Average Ethylene Unit Run Length

According to one or more embodiments, the ethylene units and $C_3$-$C_{10}$ alpha-olefin units within the copolymer may be arranged to provide good low temperature performance. On important characteristic of the arrangement of the ethylene and $C_3$-$C_{10}$ alpha-olefin units is the average ethylene unit run length. The average ethylene unit run length is an average of the number of ethylene units in each sequence of ethylene units in the copolymer. For example, in the sequence of units $C_3$-$C_{10}$ alpha-olefin-ethylene-ethylene-$C_3$-$C_{10}$ alpha-olefin the ethylene unit run length is two since there are two ethylene units in the run of ethylene units of this sequence. Thus, in a copolymer having the following two sequences (A) and (B), the ethylene unit run lengths are 2 and 3, respectively and the average ethylene unit run length is 2.5: (A) $C_3$-$C_{10}$ alpha-olefin-ethylene-ethylene-$C_3$-$C_{10}$ alpha-olefin, and (B) $C_3$-$C_{10}$ alpha-olefin-ethylene-ethylen-ethylene-$C_3$-$C_{10}$ alpha-olefin. In a copolymer molecule comprising a chain of ethylene and $C_3$-$C_{10}$ alpha-olefin units, the units are not distributed uniformly within the copolymer chain. The average ethylene unit run length may be determined by dividing the total number of ethylene units by the number of ethylene unit runs in the copolymer. For example, a copolymer having a total of four ethylene units and three runs of ethylene units has an average ethylene unit run length of 4/3=1.33.

Methods for determining values of the average ethylene unit run length are known in the art and comprise established spectroscopic procedures using $^{13}C$ nuclear magnetic resonance methods as described, for example, in "Carbon-13 NMR in Polymer Science," ACS Symposium Series 103, American Chemical Society, Washington, D.C. 1978 at p. 97 and in "Polymer Sequence Determination Carbon-13 NMR Method," J. C. Randall, Academic Press, New York, N.Y. at p. 53.

Where the arrangement of the units in the copolymer chains is purely random, each unit has a chance of appearing in a certain position proportional to the remaining molar percentage of the monomer corresponding to that unit that is present in the monomer mixture, regardless of whether the immediately preceding unit is the same or different. Thus, an expected average ethylene unit run length for a purely random unit distribution can be calculated as a function of the molar percentage of ethylene monomer. This value is referred to herein as the statistically-expected random average ethylene unit run-length.

According to one or more embodiments, the copolymer may be synthesized by a process through which the average run length of one of the copolymer units is less than the statistically-expected random average unit run length for a given molar percentage of the monomer of that unit present in the reaction mixture. For example, considering a copolymer of ethylene and propylene units, one or more catalysts and/or co-catalysts may be chosen such that during copolymer chain formation, a propylene unit is favored to bond to a preceding ethylene unit, while an ethylene unit is favored to bond to a preceding propylene unit, as discussed further below. As a result of this choice, the average ethylene unit run length in the copolymer can be reduced to be less than the statistically-expected random average unit run length for the given molar percentage of ethylene monomers in the reaction mixture. Where the average run length is less than the statistically-expected random average unit run-length, the copolymer is referred to as being between "statistical" and "alternating", where "alternating" refers to a copolymer wherein the ethylene and propylene units always alternate. Alternatively, where the average unit run length is greater than the statistically-expected random average unit run-length, the copolymer is said to between "statistical" and "blocky."

According to one or more embodiments, an average ethylene unit run length in the copolymer is, at least in part, a function of the percentage of ethylene units in the copolymer, and the chosen catalyst(s) and co-catalyst(s). For example, a higher percentage of ethylene units in the copolymer will result in a higher average ethylene unit run length. The choice of catalyst and co-catalyst may be used to affect the average ethylene unit run length, in situations where the catalyst affects the relative insertion rate of insertion of the different units of the copolymer.

During polymer chain formation, the reaction rate at which an ethylene monomer bonds to a preceding ethylene unit at the end of the growing copolymer chain is referred to as the ethylene-ethylene reaction rate constant ("$k_{pEE}$"). The reaction rate at which a propylene (or other alpha-olefin monomer) bonds to an ethylene unit at the end of the growing copolymer chain is referred to as the ethylene-propylene reaction rate constant ("$k_{pEP}$"). The reactivity ratio of ethylene ("$r_E$") refers to the ratio of the ethylene-ethylene reaction rate constant to the ethylene-propylene reaction rate constant, $k_{pEE}/k_{pEP}$.

Likewise, the reaction rate at which a propylene (or other alpha-olefin) monomer bonds to a propylene unit at the end of the growing copolymer chain is referred to as the propylene-propylene reaction rate constant ("$k_{pPP}$"). The reaction rate at which an ethylene monomer bonds to a propylene unit at the end of the growing copolymer chain is referred to as the ethylene-propylene reaction rate constant ("$k_{pPE}$"). The reactivity ratio of propylene ("$r_P$") refers to the ratio of the propylene-propylene reaction rate constant to the propylene-ethylene reaction rate constant, $k_{pPP}/k_{pPE}$.

The lower each of the reactivity ratios ($r_E$ or $r_P$) are, the more likely it is that a different unit will follow the preceding unit and thus the resulting copolymer chain will tend to have an alternating character, with a lower average ethylene unit run length than the statistically-expected random average ethylene unit run-length. According to one or more embodiments, selection of an appropriate catalyst, as well as control of other process parameters, may reduce one or more of the reactivity ratios for various units/monomers and may therefore also reduce the average ethylene unit run length.

A lower average ethylene unit run length may provide certain advantages. For example, it may result in a lower crossover temperature for the copolymer, thereby improving one or more aspects of performance such as cold-weather performance of a polyolefin plasticized with the copolymer. In general, the shorter the average ethylene unit run length, the lower the crossover temperature of the copolymer, which ultimately results in a better low temperature performance for polyolefins plasticized with the copolymer.

Figure 2:
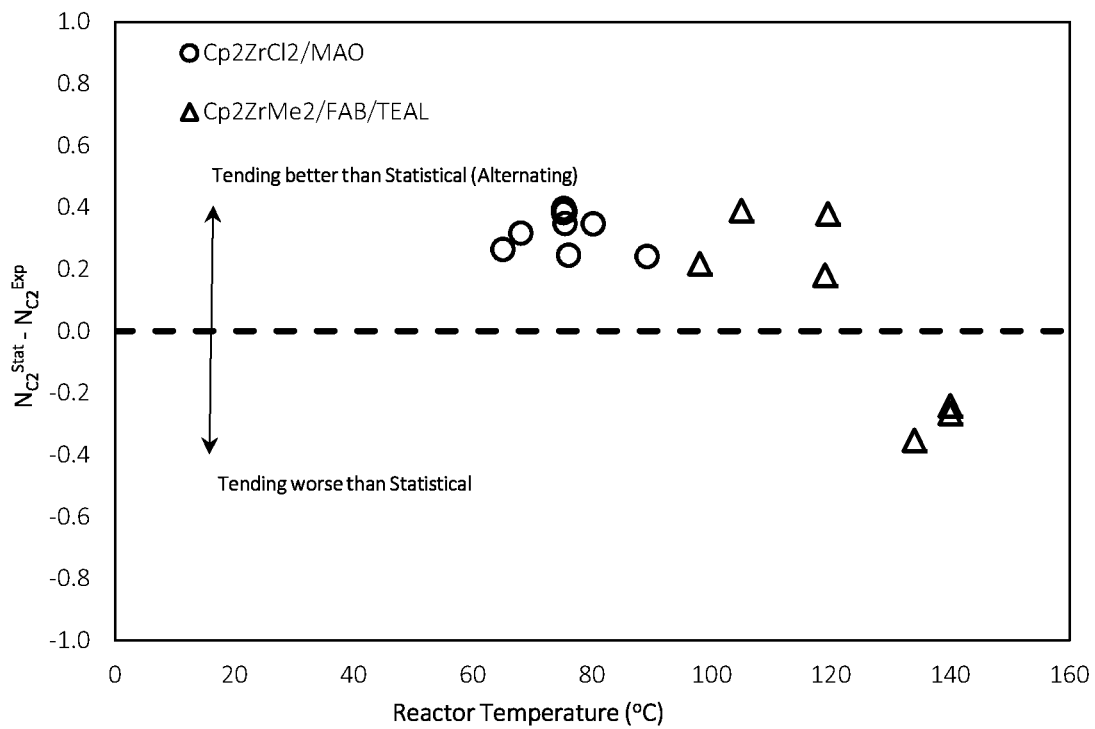
FIG. 2 is a graphical representation of the effect of reactor temperature on microstructure, according to one or more embodiments.

According to one or more embodiments, a copolymer comprising ethylene and $C_3$-$C_{10}$ alpha-olefin units is selected to have an average ethylene unit run length that is less than the statistically-expected random average ethylene unit run-length for the given molar percentage of ethylene units in the copolymer. The formulae (2)-(5) below can be used to calculate the statistically-expected random average ethylene unit run-length for the given molar percentage of ethylene units in the copolymer. For example, as shown in FIG. 2, copolymerization in the presence of a coordination polymerization catalyst comprising the coordinated metallocene $Cp_2ZrCl_2$, and a methylaluminoxane co-catalyst, under certain conditions, results in the production of a copolymer having an average ethylene unit run length that is less than the statistically expected run length for a random distribution at the given molar percentage of ethylene units in the copolymer.

According to one or more embodiments, the copolymer may have an average ethylene unit run length that is less than 3.0, less than 2.9, less than 2.8, less than 2.7, less than 2.6, less than 2.5, less than 2.4, less than 2.3, less than 2.1, or less than 2.0. In such embodiments, the average ethylene unit run length may also be selected to be is less than the statistically-expected random average ethylene unit run-length for the given molar percentage of ethylene units in the copolymer.

Statistical and Alternating Microstructures

Copolymers of ethylene and propylene produced with perfectly alternating microstructures do not have a distribution of ethylene unit run lengths, as every sequence of ethylene units is exactly the same length. The ethylene unit run length for a perfectly alternating microstructure is calculated from Equation (1).

$$n_{C2, Alternating} = \frac{x_{C2}}{(1 - x_{C2})} \tag{1}$$

Copolymers that do not have a perfectly alternating microstructure have a distribution of ethylene unit run lengths, and the prediction for a purely statistical microstructure of a copolymer represents the average ethylene unit run length for the distribution of ethylene unit run lengths in that copolymer. The average ethylene unit run length for copolymers produced with a purely statistical microstructure can be calculated using Bernoullian statistics, as shown in Equation (2). The mole fraction of ethylene incorporated in the polymer, $x_{ethylene}$, as measured by $^1$H-NMR spectroscopy, is used to calculate the fraction of EEE, EEP and PEP triads in the copolymer (there are also EPE, PPE and PPP triads) in a purely statistical polymer using Equations (3)-(5) given below.

$$n_{C2, Statistical} = \frac{(EEE + EEP + PEP)}{(PEP + 0.5 EEP)} \tag{2}$$

$$EEE = (x_{C2})^3 \tag{3}$$

$$EEP = 2(x_{C2})^2(1 - x_{C2}) \tag{4}$$

$$PEP = x_{C2}(1 - x_{C2})^2 \tag{5}$$

E represents an ethylene unit and P represents a propylene unit and thus the triad "EPE" represents the three unit triad ethylene-propylene-ethylene.

The experimental ethylene incorporation in mol % was determined by $^1$H-NMR using a standard technique known to those of ordinary skill in the art. The experimental average ethylene unit run length was determined by $^{13}$C-NMR using the standard technique discussed above. A comparison of the experimentally determined average ethylene unit run length and the calculations for the alternating and statistical results are shown in FIG. 1 at different molar percentages of ethylene incorporation. A comparison of the experimental results for ethylene unit run length to the calculated statistical and alternating results yields an indication of whether the copolymers have microstructures that are worse or better than statistical. It is believed that microstructures that are worse than statistical have a broader distribution of ethylene unit run lengths about the average ethylene unit run length. Such microstructures have some ethylene unit run lengths that are worse than the average and some that are better than the average.

Increasing the ethylene content of the copolymer increases the plasticization efficiency, plasticization durability, and oxidative stability of the plasticizer but also decreases the amount of structure forming that may occur at lower temperatures. It is unexpected that the particular combination of properties and microstructure of the copolymer of the present invention provides adequate plasticization efficiency, plasticization durability, and oxidative stability while at the same time providing a good low temperature performance.

The results shown in FIG. 1 were produced with two different catalyst systems. The ethylene incorporation was controlled during the polymerization using standard techniques known in the art. The copolymerization using the $Cp_2ZrCl_2$/MAO catalyst system was carried out at a lower temperature and within a narrower temperature range than the copolymerization using the $Cp_2ZrMe_2$/FAB/TEAL catalyst system, shown in FIG. 2.

The copolymerization reaction can be controlled to provide the desired copolymers of the invention. Parameters such as the reaction temperature, pressure, mixing, reactor heat management, feed rates of one or more of the reactants, types, ratio, and concentration of catalyst and/or co-catalyst and/or scavenger as well as the phase of the feed components can be controlled to influence the structure of the copolymer obtained from the reaction. Thus, a combination of several different reaction conditions can be controlled to produce the desired copolymer.

For example, it is important to run the copolymerization reaction with appropriate heat management. Since the copolymerization reaction is exothermic, in order to maintain a desired set point temperature in the reactor heat must be removed. This can be accomplished by, for example, two different methods often practiced in combination. Heat can be removed by cooling the feed stream to the reactor to a temperature well below the reaction set point temperature (even sometimes cryogenically) and therefore allowing the feed stream to absorb some of the heat of reaction through a temperature rise. In addition, heat can be removed from the reactor by external cooling, such as a cooling coil and/or a cooling jacket. The lower the set point temperature in the reactor, the more demand there is for heat removal. The higher the reaction temperature, the less heat needs to be removed, or alternatively or in combination, the more concentrated the copolymer can be (higher productivity) and/or the shorter the residence time can be (smaller reactor). The results characterizing the deviation of the average ethylene unit run length from a purely statistical microstructure are shown in FIG. 2 for both catalyst systems plotted versus the temperature of the reactor during the copolymerization.

As the reaction temperature was increased beyond 135° C., it appears that control of the microstructure may be lost and the copolymer typically becomes worse than statistical. As a result, the low temperature properties of the copolymer may be compromised. Without being bound by theory, the reduced control of the microstructure of copolymers produced at higher temperatures is believed to be due to a drop in the reaction kinetics of comonomer incorporation relative to ethylene incorporation. The more difficult it is for the comonomer to incorporate in the copolymer, the less regularly the comonomer breaks up the runs of ethylene units in the chain during copolymerization. Some strategies for improving the incorporation of comonomer at higher reaction temperatures include increasing the ratio of monomers of $C_3$-$C_{10}$ alpha-olefin/ethylene in the reactor, increasing the Al/Zr ratio in the catalyst or by making changes in the catalyst architecture.

Thus, in some embodiments of the invention, reaction temperatures of 60-135° C. are employed for the copolymerization reaction, or, more preferably, reaction temperatures of 62-130° C., or 65-125° C., or preferably 68-120° C. or 70-90° C., are employed for the copolymerization reaction.

A preferred Al/Zr ratio in the catalyst system may be less than 10,000:1, less than 1,000:1, less than 100:1, less than 10:1, less than 5:1, or less than 1:1. For boron-containing technology, a preferred Al/Zr ratio in the catalyst is less than 100:1, less than 50:1, less than 10:1, less than 5:1, less than 1:1, less than 0.1:1 and a preferred B/Zr ratio is less than 10:1, less than 5:1, less than 2:1, less than 1.5:1, less than 1.2:1, or less than 1:1.

Low temperature properties of the copolymer can be correlated to the microstructure of the copolymer. Low temperature performance of the pure copolymer is measured by Oscillatory Rheometry. The point at which storage modulus is equal to the loss modulus, the crossover or onset temperature, is an indication of the temperature at which the copolymer will begin to exhibit unfavorable structure forming. The crossover temperature is the point at which the structure formed in the polymer exceeds the liquid-like character of the polymer. This temperature has been shown to be predictive for determining the impact of the copolymer structure on low temperature performance as a polyolefin plasticizer.

Figure 3:
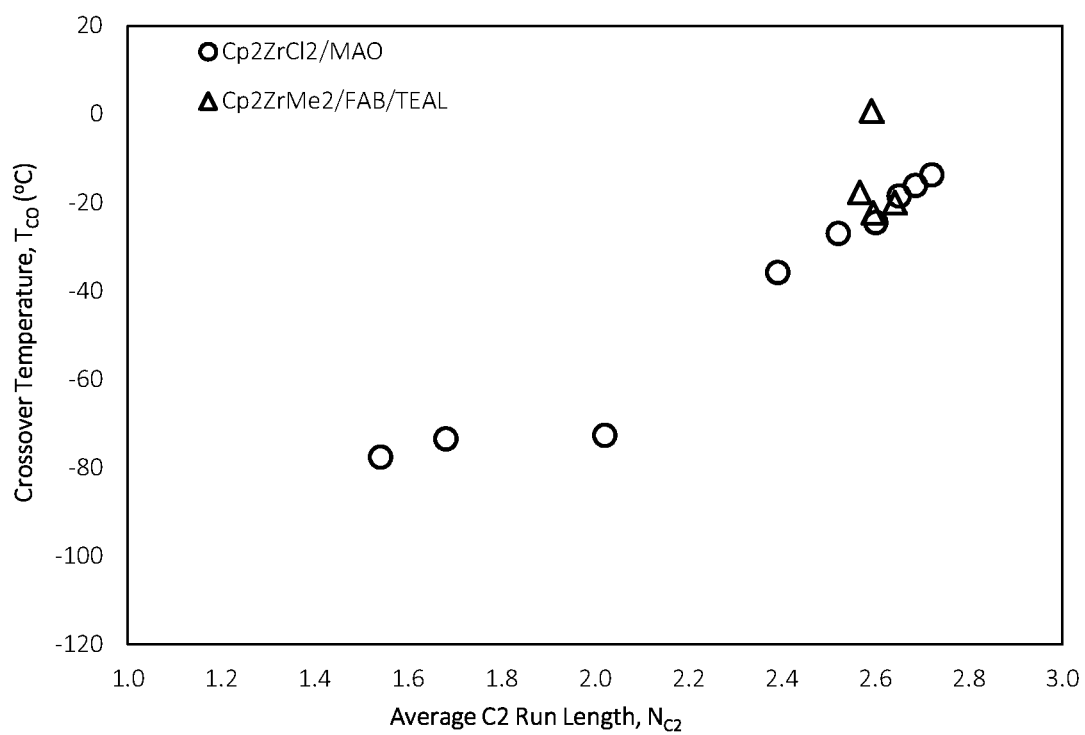
FIG. 3 is a graphical representation of the crossover temperature versus average ethylene unit run length for worse than statistical and better than statistical microstructures, according to one or more embodiments.
Figure 4:
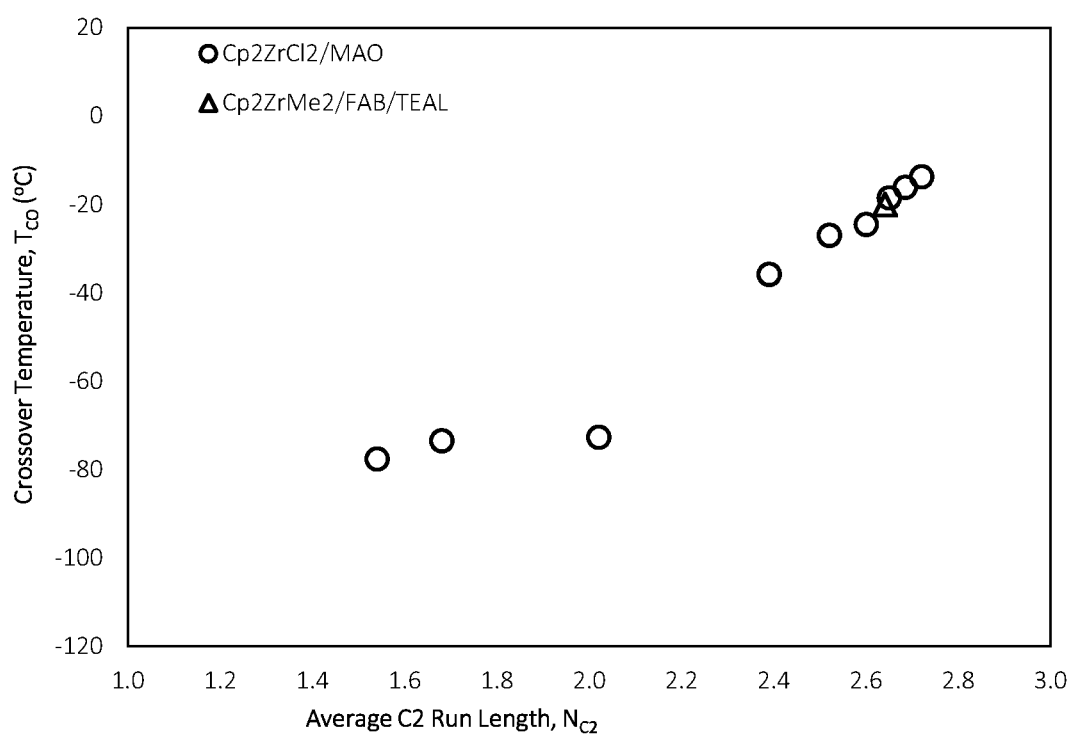
FIG. 4 is a graphical representation of the crossover temperature versus average ethylene run length for only copolymers better than statistical microstructures, according to one or more embodiments.

The impact of average ethylene unit run length on crossover temperature is shown in FIGS. 3 and 4. The copolymers produced with the $Cp_2ZrCl_2$/MAO catalyst system are well-behaved and there is a strong correlation between crossover temperature and average ethylene unit run length. The copolymers produced with the $Cp_2ZrMe_2$/FAB/TEAL catalyst system can be controlled to provide the desired combination crossover temperature and average ethylene unit run length. A particularly wide range of crossover temperatures is observed for the copolymers produced using the $Cp_2ZrMe_2$/FAB/TEAL catalyst system is shown in FIG. 3. Specifically, at an approximate ethylene unit run length of 2.6, the crossover temperature of these copolymers varies from almost −40° C. to about 5° C. This wide range in crossover temperature correlates with the wide variety of different microstructures that was also observed for these copolymers at the same average ethylene unit run length.

Triad Distribution

In some embodiments, the sequential arrangement of units in the copolymer may, alternatively, be described with reference to the triad distribution. The triad distribution refers to the statistical distribution of the possible combinations of three units in a row in the copolymer chain. Taking as an example an ethylene-propylene copolymer, where "E" represents an ethylene unit and "P" represents a propylene-derived unit, the potential combinations of unit triads are: EEE, EEP, PEP, EPE, PPE, and PPP. According to one or more embodiments, the percentage of EEE units based on the total number of unit triads in the copolymer is preferably less than 20%, less than 10%, or less than 5%. The percentage of EEE units is indicative of a relatively short average ethylene unit run length in such copolymers.

The method used for calculating the triad distribution of ethylene-propylene copolymers is described in J. C. Randall *JMS-Review Macromolecules Chem Physics* ethylene 9, 201 (1989) and E. W. Hansen, K. Redford *Polymer* Vol. 37, No. 1, 19-24 (1996). After collecting $^{13}C(^1H)$ NMR data under quantitative conditions, eight regions (A-H), shown in Table 1 are integrated. The equations of Table 2 are applied and the values normalized. For the examples described herein, the D, E, and F regions were combined due to peak overlap in the NMR spectra. The symbol "k" represents a normalization constant and T=the total intensity.

TABLE 1

Integral Regions

| Region | Chemical Shift (ppm) |
| --- | --- |
| A | 43.5-48.0 |
| B | 36.5-39.5 |
| C | 32.5-33.5 |
| D | 29.2-31.2 |
| E | 28.5-29.3 |
| F | 26.5-27.8 |
| G | 23.5-25.5 |
| H | 19.5-22.5 |

TABLE 2

Equations $k(EEE) = 0.5(T_{DEF} + T_A + T_C + 3T_G - T_B - 2T_H)$
$K(PEE + EEP) = 0.5(T_H + 0.5T_B - T_A - 2T_G)$
$k(PEP) = T_G$
$k(EPE) = T_C$
$k(EPP + PPE) = 0.5(2T_H + T_B - 2T_A - 4T_C)$
$k(PPP) = 0.5(3T_A + 2T_C - 0.5T_B - T_H)$ Molecular Weight The number average molecular weight of the copolymer can be determined by $^1$H-NMR or gel permeation chromatography (GPC), as described in U.S. Pat. No. 5,266,223, with the GPC method being preferred. The GPC method additionally provides molecular weight distribution information; see W. W. Yau, J. J. Kirkland and D. D. Bly, "Modern Size Exclusion Liquid Chromatography", John Wiley and Sons, New York, 1979. According to some embodiments, the copolymer may have a number average molecular weight of less than 5,000 g/mol, of less than 4,500 g/mol, of less than 4,000 g/mol, of less than 3,500 g/mol, of less than 3,000 g/mol, of less than 2,800 g/mol, of less than 2,500 g/mol, of less than 2,000 g/mol, of less than 1,500 g/mol, or of less than 1,000 g/mol as determined by GPC. According to some embodiments, the copolymer may have a number average molecular weight of greater than 200 g/mol, 500 g/mol, of greater than 800 g/mol, of greater than 1,000 g/mol, as determined by GPC. Combinations of all of the above-referenced end points to form ranges are also possible and are disclosed herein. Other values are also possible.

The polydispersity index (PDI) of the copolymer is a measure of the variation in the length, in units, of the individual chains of the copolymer. The polydispersity index is determined by dividing the weight average molecular weight ($M_w$) of the copolymer by the number average molecular weight ($M_n$) of the copolymer. The term number average molecular weight (determined by, e.g., $^1$H-NMR or GPC) is given its ordinary meaning in the art and is defined as the sum of the products of the weight of each polymer chain and the number of polymer chains having that weight, divided by the total number of polymer chains. The weight average molecular weight of the copolymer is given its ordinary meaning in the art and is defined as the sum of the products of the weight squared of each polymer chain and the total number of polymer chains having that weight, divided by the sum of the products of the weight of each polymer chain and the number of polymer chains having that weight. According to one or more embodiments, the PDI of the copolymer ($M_w/M_n$) may be less than or equal to 4, less than or equal to 3, less than or equal to 2, or less than or equal to 1.

In some embodiments, it is desirable to provide copolymers that have a lower kinematic viscosity without reducing the molecular weight of the copolymer. This goal can be achieved in certain embodiments by controlling the microstructure of the copolymer as discussed above.

Viscosity and Complex Viscosity

Figure 6:
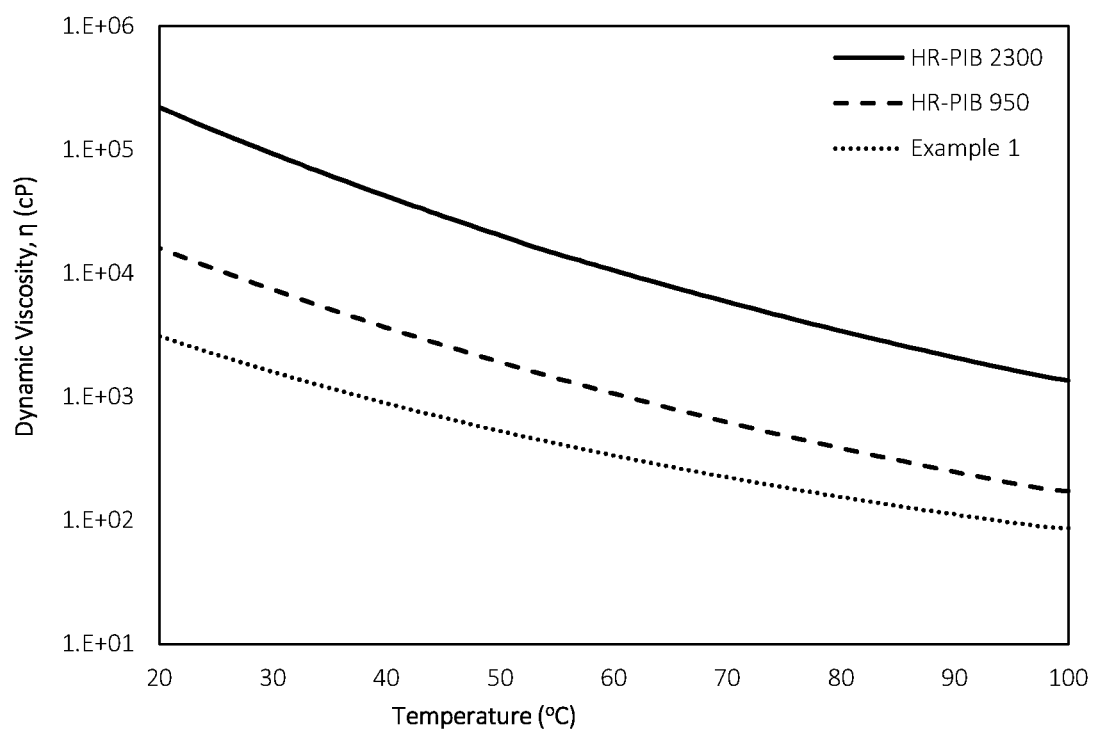
FIG. 6 is a graphical representation of the dynamic viscosity in centipoise (cP) measured by rotational rheometry versus temperature comparing a 950 number average molecular weight HR polyisobutylene to the product of Example 1 in accordance with the present invention.

One goal of embodiments herein is the provision of a copolymer with a lower viscosity and higher molecular than a comparable copolymer. For example, referring to FIG. 6, there is shown a comparison of the viscosity versus temperature of a 950 number average molecular weight polyisobutylene (TPC595) to a 1053 number average molecular weight copolymer of 49 mol % ethylene and 51 mol % propylene (EP-4951-1053) in accordance with the present invention. FIG. 6 shows that the viscosity of the copolymer of the present invention is significantly lower than the viscosity of polyisobutylene at all relevant temperatures even though the copolymer of the present invention has a higher molecular weight than the polyisobutylene. In this manner, improved plasticization can be achieved while also obtaining the advantage of a higher molecular weight which will tend to reduce diffusion of the copolymer to the surface of a polyolefin polymer and/or inhibit volatilization of the copolymer from the polyolefin.

Figure 5:
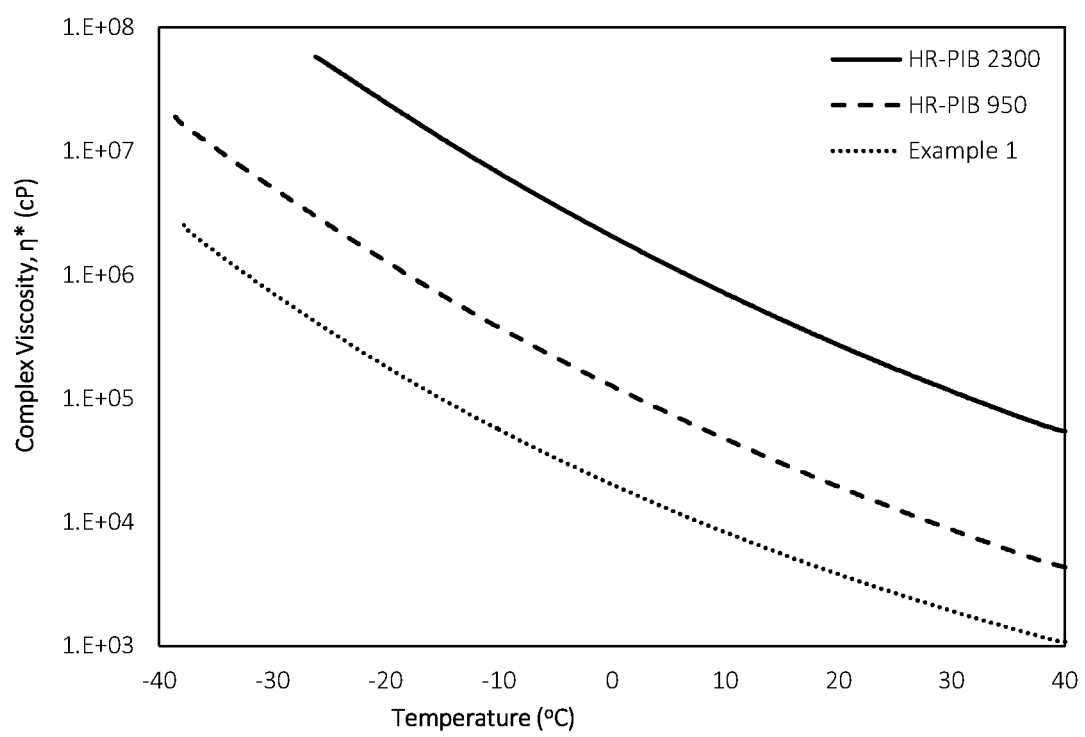
FIG. 5 is a graphical representation of the complex viscosity in centipoise (cP) measured by oscillatory rheometry versus temperature to show the copolymer viscosity normalized by the 1H-NMR determined $M_n$ and raised to the 3.4 power to remove the effect of molecular weight, comparing a 950 number average molecular weight highly reactive (HR) polyisobutylene, and a 2300 number average molecular weight HR polyisobutylene to the product of Example 1 in accordance with the present invention.

FIG. 6 can be compared to FIG. 5 to see that for good copolymers with poor microstructures, the complex viscosity is essentially the same as the dynamic viscosity. However, if Mn is high enough (e.g. greater than 3 times the entanglement (Me) for the polymer), the complex viscosity will vary from the dynamic viscosity. Examples of this variation due to entanglement can be seen in FIG. 7 where certain comparative copolymers exhibited erratic complex viscosities as the temperature decreased.

Figure 7:
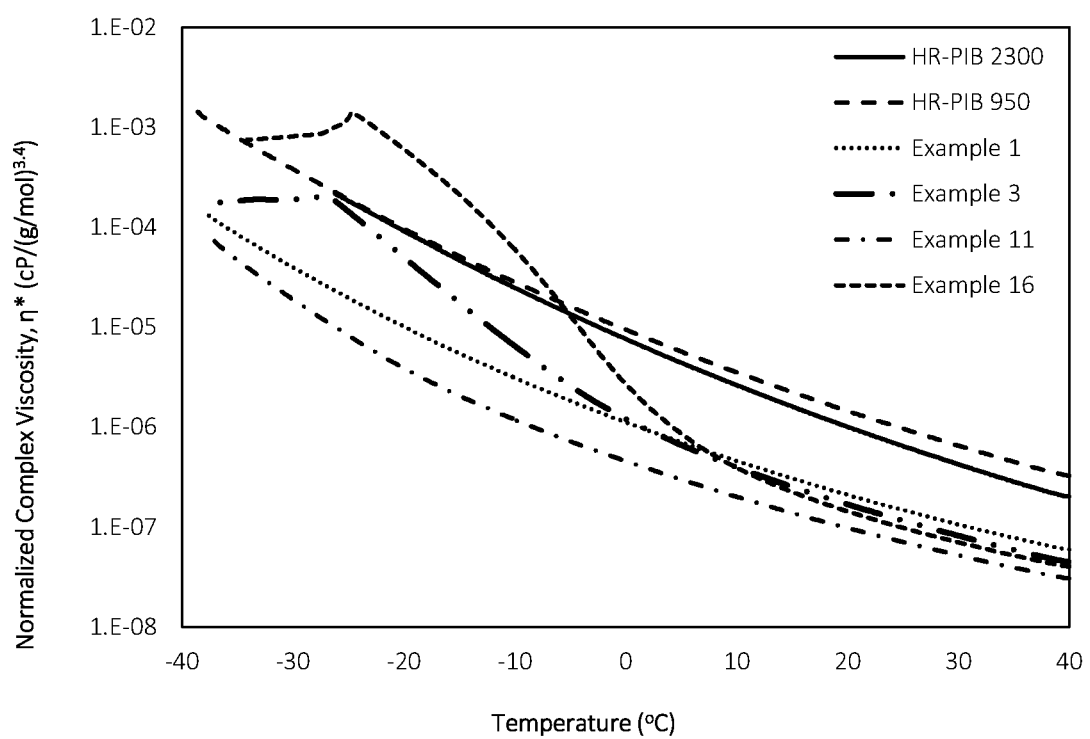
FIG. 7 is a graphical representation of the complex viscosity in centipoise (cP) measured by oscillatory rheometry versus temperature to show the copolymer viscosity normalized by the 1H-NMR determined $M_n$ and raised to the 3.4 power to remove the effect of molecular weight, comparing the following materials 950 number average molecular weight HR polyisobutylene, 2300 number average molecular weight HR polyisobutylene, and a number of ethylene propylene copolymers.

FIG. 7 is a graphical representation of the complex viscosity in centipoise (cP) measured by oscillatory rheometry versus temperature to show the copolymer viscosity normalized by the 1H-NMR determined $M_n$ and raised to the 3.4 power to remove the effect of molecular weight. This data shows that for ranges of temperature where poor copolymer microstructure has little or no impact on the complex viscosity, there is a clear distinction between the copolymers of the invention and polyisobutylene, as also shown in FIGS. 5-6. When poor microstructure begins to impact the complex viscosity, a clear deviation occurs indicative of structure formation in the copolymer, as shown by the comparative ethylene-propylene copolymers which had poor microstructure. As a result, these copolymers with poor microstructure will not be as beneficial for plasticization in this range of temperatures where microstructure plays an important role since structure forming in such copolymers will lead to an undesirable viscosity increase.

Ethylene Content

The copolymer may comprise a certain mole percentage (mol %) of ethylene or ethylene units. According to some embodiments, the molar percentage of ethylene in the copolymer, is at least 10 mol %, at least 20 mol %, at least 30 mol %, at least 40 mol %, at least 45 mol %, at least 50 mol %, at least 55 mol %, at least 60 mol %, at least 65 mol %, at least 70 mol %, or at least 75 mol %. According to some embodiments, the molar percentage of ethylene units in the copolymer is less than 80 mol %, less than 75 mol %, less than 70 mol %, less than 65 mol %, less than 60 mol %, less than 55 mol %, less than 50 mol %, less than 45 mol %, less than 40 mol %, less than 30 mol %, or less than 20 mol %, Combinations of each of the above-mentioned end points to form ranges are also possible and are disclosed herein. Other ranges are also possible.

$C_3$-$C_{10}$ Alpha Olefin Comonomer Content

The copolymer may comprise a certain mole percentage of $C_3$-$C_{10}$ alpha-olefin units. According to some embodiments, the molar percentage of the $C_3$-$C_{10}$ alpha-olefin units the copolymer, relative to the total units within the copolymer, is at least 20 mol %, at least 25 mol %, at least 30 mol %, at least 35 mol %, at least 40 mol %, at least 45 mol %, at least 50 mol %, at least 55 mol %, at least 60 mol %, at least 65 mol %, at least 70 mol %, or at least 80 mol %. According to some embodiments, the $C_3$-$C_{10}$ alpha-olefin content of the copolymer is less than 90 mol %, less than 80 mol %, less than 70 mol %, less than 65 mol %, less than 60 mol %, less than 55 mol %, less than 50 mol %, less than 45 mol %, less than 40 mol %, less than 35 mol %, less than 30 mol %, less than 25 mol %, or less than 20 mol %, less than 90 mol %. Combinations of any the above referenced limits can be made to form ranges and are possible and disclosed herein. Other ranges are also possible.

Unsaturation

In many applications for plasticizers known in the art, it may be desirable to provide a polymerizable plasticizer, a functionalizable plasticizer or a reactive plasticizer. For one or more of these purposes, it is desirable to include unsaturation in the copolymers of the present invention.

In the embodiments of the invention, the copolymer comprises a plurality of copolymer molecules, at least 70% of which copolymer molecules contain terminal unsaturation, i.e., a carbon-carbon double bond in the terminal unit of the copolymer. According to some embodiments, more than 75%, more than 80%, more than 85%, more than 90%, more than 95%, or more than 97%, of the copolymer molecules contain terminal unsaturation. The percentage of polymeric chains exhibiting terminal unsaturation may be determined by FTIR spectroscopic analysis, titration, or $^{13}C$ NMR. See, e.g., U.S. Pat. No. 5,128,056.

End Groups

In the embodiments of the invention, the copolymer may terminate, at one end, with either an ethylene unit or a $C_3$-$C_{10}$ alpha-olefin unit. The terminal unsaturation mentioned above is located within a terminal group of the copolymer molecule. If the terminal group containing the terminal unsaturation is an ethylene unit, the terminal unsaturation is present in either a vinyl group or a di-substituted isomer of a vinyl group. If the terminal group containing the terminal unsaturation is a $C_3$-$C_{10}$ alpha-olefin unit, the terminal unsaturation is present in either a vinylidene group or a tri-substituted isomer of a vinylidene group.

In some embodiments, more than 70%, more than 75%, more than 80%, more than 85%, more than 90%, or more than 95% of the terminal unsaturation is located within a $C_3$-$C_{10}$ alpha-olefin terminal unit. In such case, the terminal group has one or more of the following structural formulas (I)-(III):

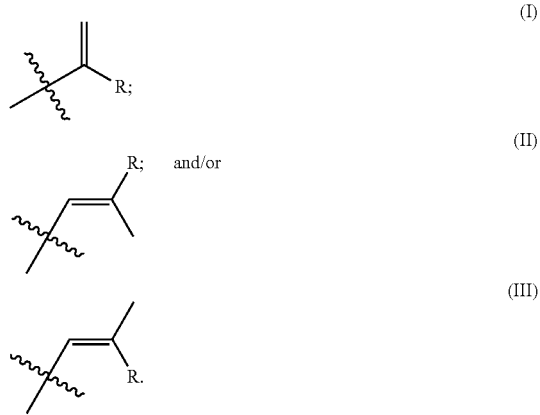

For each of Formulas (I)-(III), R represents the appropriate alkyl group for that particular $C_3$-$C_{10}$ alpha-olefin unit, e.g., a methyl group if the alpha olefin is propylene, an ethyl group if the alpha olefin is 1-butene, etc., and

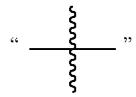

indicates the bond that is the point of attachment of the group (I), (II) or (III) to to the remaining portion of the copolymer molecule.

As used herein, the terms "terminal vinylidene" and "terminal vinylidene group" refer to the structure represented by Formula (I). As used herein, the terms "tri-substituted isomer of terminal vinylidene" and "tri-substituted isomer of terminal vinylidene group" refer to one of the structures represented by the Formulas (II) and (III).

Terminal vinylidene, tri-substituted isomers of terminal vinylidene, as well as other types of terminal unsaturation in the copolymers can be detected by $^1$H-NMR. From the integrated intensity of each signal, the amount of each terminal group can be determined as discussed in US 2016/0257862.

Chemical Compatibility

There are many tests that can be used to evaluate the chemical compatibility of thermoplastic materials. Three major groups of tests for chemical compatibility include retention of physical/mechanical properties, visual evaluations and creep and creep rupture. Physical properties such as change in volume, weight, dimensions, or hardness are particularly useful when evaluating chemical compatibility. Tests monitoring the change in weight or hardness would be a good indication of chemical compatibility. Plasticization allows movement of the individual molecular chains causing the polymer to become increasingly flexible as more plasticizer is absorbed. As in the case with solvation, change in weight, hardness, and in addition, dimension and volume are good indicators of chemical compatibility.

Mechanical properties such as tensile strength and elongation, impact, and flexural strength can be very good indicators of chemical compatibility. In this type of testing the properties are performed initially and again after time has elapsed. Plasticization tends to soften polymers, increasing the ductility and thus causing an increase in the tensile elongation while at the same time lowering tensile strength. The changes that occur are dependent on the amount of plasticizer present and thus results can be affected by other factors. Chemical compatibility effects that can be difficult to determine by other methods such as Environmental Stress Cracking (ESC) can be established by testing retention of tensile properties.

Visual evaluations can be used in conjunction with almost any test method when determining chemical compatibility. One such test method is ASTM D543, which combines visual evaluations with other tests. There are, however, test methods where visual evaluations and ratings are the primary result. ASTM D1693, is designed for use with ethylene type plastics and involves bending test specimens in a fixture, nicking the specimens to initiate a controlled imperfection, and optionally applying chemical agents. The specimens are then evaluated for crack growth and results determined based on the number and severity of the cracks. ASTM D1 693 is limited to flexible materials, primarily opaque, and to the observance of cracking.

Polymers can exhibit elastic deformation and reduction in strength when solvation/plasticization occurs. Creep measurements are therefore useful in determining compatibility with solvents or plasticizers. ASTM D2990 is a suitable test for creep measurements.

Estimation of the solubility parameter is another suitable way to determine chemical compatibility. The solubility parameter and molar volume of each monomer can be estimated from the structure of the monomer. Specifically, the estimation method of Fedors, R. F., "A Method for Estimating Both the Solubility Parameters and Molar Volumes of Liquids," *Pol. Eng. Sci.*, 14, 147-154 (1974) is employed for the copolymers of the present application. This method employs the formula:

$$\delta_t = \left(\frac{\sum \Delta e_i}{\sum \Delta v_i}\right)^{1/2}$$

wherein the group contributions are as given in Table 3 below.

TABLE 3

Group Contributions

| Group | $\Delta e_i$/cal mol$^{-1}$ | $\Delta v_i$/cm$^3$ mol$^{-1}$ |
|---|---|---|
| CH3— | 1120 | 33.5 |
| CH2— | 1180 | 16.1 |
| CH— | 820 | -1.0 |

The group contributions shown in Table 3 are added for each monomer unit to obtain the total for each copolymer. For copolymers, the following equation of Schneier. B., "An Equation for Calculating the Solubility Parameter of Random Copolymers," *Pol. Lett.*, 10, 245-251 (1972) can be used.

$$\delta_x = \frac{\delta_1 V_1 X_1 + \delta_2 V_2 X_2}{[(V_1 X_1 + V_2 X_2)V_x]^{\frac{1}{2}}}$$

wherein 1, 2, and x are monomer 1, monomer 2, and the mixture, respectively, V is the molar volume, δ is the solubility parameter, and X is the mole weight fraction. The mole weight fraction is:

$$X_i = \frac{n_i M_i}{n_1 M_1 + n_2 M_2}$$

where M is the monomer molecular weight and n is the number of moles of each monomer. $V_x$ is taken as the molar average of the two monomer molar volumes:

$$V_x = \frac{n_1 V_1 + n_2 V_2}{n_1 + n_2}$$

wherein the total solubility parameters are as given in Table 4 below.

TABLE 4

Comparison of Total Solubility Parameters

| Polymer | $\delta_t$/MPa$^{1/2}$ | $\delta_t$/(cal cm$^{-3}$)$^{1/2}$ |
|---|---|---|
| poly(ethylene) | 17.5 | 8.6 |
| poly(propylene) | 16.4 | 8.0 |
| poly(1-hexene) | 17.0 | 8.3 |
| polyethylene propylene) 52 mole % ethylene | 17.1 | 8.4 |
| poly(ethylene 1-hexene) 90 mole % ethylene | 19.3 | 9.4 |

In some embodiments the plasticizer has a difference of no more than 2 (cal cm$^{-3}$)$^{1/2}$ in the solubility parameter as compared to the solubility parameter of the polyolefin or other polymer into which the plasticizer is to be incorporated. Another way to calculate the solubility parameter for homopolymers is described in Small, P. A., "Some Factors Affecting the Solubility of Polymers," *J. Appl. Chem.*, 3, 71-79 (1953).

Various properties of the plasticizers of the present invention can be determined and/or evaluated based on the information given in, "Principles of Plasticization," Immergut, E. H. and Mark, H. P., (1965), doi: 10.1021/ba-1965-0048.ch001, the disclosure of which is incorporated by reference herein in its entirety for providing information for determining and evaluating properties of plasticizers.

Methods of Production of the Copolymers

A suitable method for the production of the copolymers of the invention includes a step of reacting ethylene and at least one $C_3$-$C_{10}$ alpha-olefin using a coordination polymerization catalyst and a co-catalyst at a temperature of from 60° C. to 135° C. for a time sufficient to produce a copolymer comprising ethylene units and $C_3$-$C_{10}$ alpha-olefin units. The reaction conditions are preferably controlled such that copolymer has a number average molecular weight of less than 5,000 g/mol; at least 70 mol % of the copolymer terminates in a terminal vinylidene group or a tri-substituted isomer of a terminal vinylidene group; the copolymer has an average ethylene unit run length of less than 4, as determined through NMR spectroscopy; the copolymer has an ethylene content of less than 80 mol %; and the copolymer has a crossover temperature of −20° C. or lower.

A metallocene comprises cyclopentadienyl anions ("Cp") bound to a metal center. The $C_3$-$C_{10}$ alpha-olefin content can be controlled through the selection of the metallocene catalyst component and by controlling the partial pressure or relative feed rates of the various monomers.

The metallocene catalysts employed in the production of the reactant polymers are organometallic coordination compounds which are cyclopentadienyl derivatives of a Group 4b metal of the Periodic Table of the Elements (56th Edition of Handbook of Chemistry and Physics, CRC Press [1975]) and include mono, di and tricyclopentadienyls and their derivatives of the transition metals. Particularly desirable are the metallocene of a Group 4b metal such as titanium, zirconium, and hafnium. The aluminoxanes employed in forming the reaction product with the metallocenes are themselves the reaction products of an aluminum trialkyl with water.

In certain embodiments, the coordinated metallocene may comprise a zirconium. For example, the coordinated metallocene may comprise $Cp_2ZrCl_2$. In addition, a co-catalyst may optionally be employed. The co-catalyst may comprise an aluminoxane such as methylaluminoxane.

The copolymer may be produced in a reactor. Parameters that may be controlled during the copolymerization reaction include at least pressure and temperature. The reaction may be operated continuously, semi-continuously, or batchwise. The ethylene may be delivered to the reactor as ethylene gas through a metered feed. The $C_3$-$C_{10}$ alpha-olefin may be delivered to the reactor through a separate metered feed. The catalyst and optional co-catalyst may be delivered to the reactor in solution. The weight percentage of either the catalyst or the co-catalyst in the solution delivered to the reactor may be less than 20 wt %, less than 15 wt %, less than 10 wt %, less than 8 wt %, less than 6 wt %, less than 5 wt %, less than 4 wt %, less than 3 wt %, less than 2 wt %, or less than 1 wt %, according to different embodiments. The ethylene, $C_3$-$C_{10}$ alpha-olefin, solvent and catalyst and optional co-catalyst may then be mixed in the reactor. Skilled persons are familiar with many suitable reactions, reactors and reaction conditions for copolymerization of ethylene and $C_3$-$C_{10}$ alpha-olefins. Examples of several processes for forming the copolymer are described in the examples below.

The catalyst may comprise a granular support based especially on a refractory oxide such as, for example, silica and/or alumina. Such a catalyst can be prepared by a method comprising bringing the granular support into contact with (a) a dialkylmagnesium and optionally a trialkylaluminium, (b) a halogenated hydrocarbon e.g. a monohalogenated hydrocarbon, (c) and a tetravalent titanium compound. Such a method is described in European Patent Application EP-A-453,088.

The catalyst may also contain a magnesium chloride support and in particular a preactived support such as that described in European Patent Application EP-A-336,545. A catalyst of this type can be prepared by a method comprising bringing a magnesium chloride support into contact with (a) an organometallic compound which is a reducing agent for titanium, (b) a tetravalent titanium compound and c) optionally one or more electron-donor compounds. Such a method is described in French Patent Application FR-A-2,669,640.

The catalyst may be used in the form of a solid as it is or in the form of a prepolymer, especially when it is used in a gas phase polymerization. The prepolymer is obtained by bringing the catalyst into contact with one or more of olefins e.g. containing from 2 to 8 carbon atoms such as, for example, ethylene or a mixture of ethylene with $C_3$-$C_8$ olefin(s) in the presence of an organometallic cocatalyst. In general, the prepolymer obtained contains from 0.1 to 200 g preferably from 10 to 100 g of polymer per millimole of titanium.

The catalyst may be employed with an organometallic cocatalyst which may be chosen from organoaluminium, organomagnesium and organozinc compounds. In most cases the organometallic cocatalyst is an alkylaluminium such as, for example, trimethylaluminium, triethylaluminium, tri-n-octylaluminium or else a mixture of these compounds.

The copolymers can alternatively be polymerized using catalysts prepared by the admixture of certain boron compounds with a salt of a metal selected from Groups 4a, 5a, 6a and 8, of the Mendeleeff Periodic Table. These compounds of boron are the hydrides and hydrocarbon derivatives of boron. The boron hydride used in preparing such catalytic compositions is usually diborane (B H although other hydrides of boron can also be used including, for example, pentaborane, hexaborane, and decaborane.

Hydrocarbon derivatives of boron which may be used include alkyl borons, cycloalkyl borons, aryl borons and the like. Examples of alkyl borons which can be used include, trimethyl boron, triethylboron, tripropyl boron, tributyl boron, tridecyl boron and the like. Examples of aryl borons include triphenyl boron, tritolyl boron, tri-p-xylyl boron, trinaphthyl boron and the like. Mixed hydride-hydrocarbon derivatives of boron can also be used, e. g. symmetrical or asymmetrical dimethyldiborane, methyldiborane and the like. Also the hydrocarbon-halogen derivatives of boron, e. g. dimethylboron bromide, dimethylboron iodide, diphenylboron bromide or chloride, etc can be used. Exemplary boron catalysts can be found in, for example, U.S. Pat. Nos. 3,166,536; 3,160,672 and 2,840,551.

In some embodiments, the microstructure of the copolymer may be desirably influenced by spatially distributing the composition uniformly within the reactor. Methods of ensuring uniformity of the spatial distribution include, but are not limited to, agitation, selection of particular feed locations for feeding the monomers, solvent and catalyst components and particular methods of introducing one or more of the various components. Additional factors that may impact compositional uniformity in the reactor include operation within a particular temperature and/or pressure range that provides a single fluid phase within the reactor. In some embodiments this may involve ensuring that the reactor temperature and pressure conditions remain above the entire vapor-liquid phase behavior envelope of the feed composition. It is also envisioned that premixing of two or more of the feed components may be employed and the premixing time and mixing intensity of the feed components may be useful for control of spatial uniformity within the reactor, at least in some cases. In certain embodiments it may also be desirable to ensure that no pockets of vapor exist within the reactor that would create a composition gradient either at a vapor-liquid interface or within the liquid.

Some strategies for improving the incorporation of comonomer at higher reaction temperatures include increasing the ratio of monomers of $C_3$-$C_{10}$ alpha-olefin/ethylene in the reactor, increasing the Al/Zr ratio in a zirconium-containing coordination metallocene catalyst or by making changes in the catalyst architecture.

Temperature control may be used to influence the reactivity ratios in a manner that leads to microstructures with better than statistical microstructures and/or to microstructures tending toward alternating microstructures. Typically, lower temperature are advantageous for achieving a better than statistical microstructure and/or a microstructure that tends toward alternation of the ethylene and $C_3$-$C_{10}$ alpha-olefin units. Some or all of the above may be important for controlling the microstructure within the copolymer chains as well as controlling variations of the $C_3$-$C_{10}$ alpha-olefin unit composition from chain to chain.

Functionalization of the Copolymer

According to one or more embodiments, the copolymer described herein may be functionalized. The invention provides functionalized derivatives of the copolymers described above, and provides for compositions comprising the same. The functionalized copolymers of this invention may exhibit lower viscosities for better melt flows and lower operating temperatures in various processing applications. The invention also relates to methods of using these functionalized copolymers in applications requiring particular processing elements and/or specific physical properties in the final product. In still another aspect, the invention relates to the articles prepared from these functionalized copolymers. These functionalized copolymers and polymeric blends containing the same, may be employed in the preparation of solid articles, such as moldings, films, sheets, and foamed objects. These articles may be prepared by molding, extruding, or other processes. The functionalized copolymers are useful in adhesives, tie layers, laminates, polymeric blends, and other end uses. The resulting products may be used in the manufacture of components for automobiles, such as profiles, bumpers and trim parts, or may be used in the manufacture of packaging materials, electric cable insulation, coatings and other applications.

The ethylene/$C_3$-$C_{10}$ alpha-olefin copolymers can be functionalized by incorporating at least one functional group in the copolymer structure. Exemplary functional groups may include, for example, ethylenically unsaturated mono- and di-functional carboxylic acids, ethylenically unsaturated mono- and di-functional carboxylic acid anhydrides, salts thereof and esters thereof and epoxy-group containing esters of unsaturated carboxylic acids. Such functional groups may be incorporated into the copolymer by reaction with some or all of the unsaturation in the copolymer Examples of the unsaturated carboxylic acids, dicarboxylic acids which may be present in the functionalized copolymer are those having about 3 to about 20 carbon atoms per molecule such as acrylic acid, methacrylic acid, maleic acid, fumaric acid and itaconic acid. Unsaturated dicarboxylic acids having about 4 to about 10 carbon atoms per molecule and anhydrides thereof are especially preferred. Compounds that can be reacted with the unsaturation in the copolymer include for example, maleic acid, fumaric acid, itaconic acid, citraconic acid, cyclohex-4-ene-1,2-dicarboxylic acid, bicyclo[2.21]hept-5-ene-2,3-dicarboxylic acid, maleic anhydride, itaconic anhydride, citraconic anhydride, allyl succinic anhydride, 4-methylcyclohex-4-ene-1, 2-dicarboxylic anhydride and bicyclo[2.2.1]hept-5-ene-2,3-dicarboxylic anhydride. One particularly useful functional group may be introduced using maleic anhydride.

The ethylene/$C_3$-$C_{10}$ alpha-olefin copolymers can be functionalized by an ene reaction of the alkenyl group of the copolymer and an enophile containing a multiple bond.

The amount of the functional group present in the functionalized copolymer can vary. The functional group can typically be present in an amount of at least about 0.3 weight percent, or at least 1.0 weight percent, preferably at least about 5 weight percent, and more preferably at least about 7 weight percent. The functional group will typically be present in an amount less than about 40 weight percent, preferably less than about 30 weight percent, and more preferably less than about 25 weight percent, or less than about 10 weight percent and more preferably less than about 5 weight percent. A desirable range can be any combination of any lower wt % limit with any upper wt % limit described herein provided the lower limit is less than the upper limit, each of which combinations of upper and lower limits are disclosed herein.

Polymers Plasticized with the Copolymers

The ethylene/$C_3$-$C_{10}$ alpha olefin copolymers described herein are blended with at least one polyolefin to prepare the plasticized compositions of this invention.

Suitable polyolefins include homopolymers or copolymers of one or more olefins selected from $C_2$ to $C_{20}$ linear, branched, cyclic, and aromatic-containing monomers, specifically including ethylene, 1-butene, 1-pentene, 1-hexene, 1-heptene, 1-octene, 1-nonene, 1-decene, 1-dodecene, 4-methyl-1-pentene, 3-methyl-1-pentene, 3,5,5-trimethyl-1-hexene, 5-ethyl-1-nonene, vinylcyclohexane, vinylcyclohexene, vinylnorbornene, ethylidene norbornene, cyclopentadiene, cyclopentene, cyclohexene, cyclobutene, vinyladamantane, styrene, alpha-methylstyrene, para-alkyl-styrenes such as paramethyl styrene, 4-phenyl-1-butene, allyl benzene, vinyltoluenes, vinylnaphthalene, allyl benzene, and indene. For example, the polyolefin may be poly(4-methyl-pentene-1) homopolymer, or a copolymer of 4-methyl-penten-1 and another olefin.

Preferred polyolefins include polyethylene homopolymers, polypropylene homopolymers, polybutene homopolymers, ethylene-propylene copolymers, ethylene-butene copolymers, ethylene-hexene copolymers, ethylene-octene copolymers, propylene-butene copolymers, propylene-hexene copolymers, propylene-octene copolymers, and copolymers of one or more olefins selected from $C_2$ to $C_4$ olefins with one or more comonomers selected from diolefins and oxygen-containing olefins (examples being ethylene-propylene-diene and ethylene-vinyl acetate copolymers). The polyolefin component may be a blend of one or more polyolefins, or a blend of polymers comprising at least 50 wt % of one or more polyolefins.

In certain embodiments, the polyolefin is selected from the general class of polyolefins known as "polyethylene" (i.e., ethylene homopolymers, ethylene copolymers, and blends thereof). These include plastomers having a density of less than 0.91 g/cm; low density polyethylene having a density of more than 0.91 g/cm$^3$ to less than 0.94 g/cm$^3$; and high density polyethylene (HDPE) having a density of 0.94 g/cm$^3$ or more. A polyethylene material comprises at least 50 mole %, or 60 mol %, or at least 70 mol %, or at least 80 mol %, or at least 90 mol %, or at least 95 mol %, or 100 mole % ethylene units. Polyethylene copolymers may be random copolymers, statistical copolymers, block copolymers, and blends thereof. Comonomers are preferably selected from $C_3$ to $C_{20}$ alpha-olefins, or from $C_3$ to $C_{10}$ alpha-olefins, or from 1-butene, 1-hexene, and 1-octene; and preferably are present from 0.1 to 20 wt %, or from 0.5 to 10 wt %, or from 1 to 5 wt %, or from 2 to 35 wt %, or from 5 to 30 wt %, or from 15 to 25 wt %. Polyethylene copolymers may comprise up to 50 mol % diene.

In other embodiments, the polyolefin is selected from the general class of polyolefins known as "polypropylene" (i.e., propylene homopolymers, copolymers, and blends thereof). These include isotactic polypropylene (iPP), highly isotactic polypropylene, syndiotactic polypropylene (sPP), homopolymer polypropylene (hPP, also called propylene homopolymer or homopolypropylene), so-called random copolymer polypropylene. A polypropylene material comprises at least 50 mol %, or 60 mol %, or at least 70 mol %, or at least 80 mol %, or at least 90 mol %, or at least 95 mol %, or 100 mol % propylene units. Polypropylene copolymers may be random copolymers, statistical copolymers, block copolymers, impact copolymers, and blends thereof. Comonomers are preferably selected from ethylene and $C_4$ to $C_{20}$ alpha-olefins, or from ethylene and $C_4$ to $C_{10}$ alpha-olefins, or from ethylene, 1-butene, 1-hexene, and 1-octene; and preferably are present from 0.1 to 20 wt %, or from 1 to 10 wt %, or from 2 to 5 wt %, or from 2 to 35 wt %, or from 5 to 30 wt %, or from 15 to 25 wt %. Polypropylene copolymers may also comprise up to 50 mol % diene.

In other embodiments, the polyolefin is selected from the general class of polyolefins known as "polybutene" (i.e., butene-1 homopolymers, copolymers, and blends thereof). The homopolymer may be atactic, isotactic, or syndiotactic polybutene, and blends thereof. The copolymer can be a random copolymer, a statistical copolymer, a block copolymer, and blends thereof. Random copolymers include those where the comonomer is selected from ethylene, propylene, 1-hexene, and 1-octene. Blends include impact copolymers, elastomers and plastomers, any of which may be physical blends or in situ blends with the polybutene. Poly(I-butene) homopolymers and 1-butene/ethylene copolymers are commercially available from Basell Polyolefins.

In other embodiments, the polyolefin is selected from the general class of polyolefins known as "ethylene-propylene (EP) elastomers" which are copolymers of ethylene and propylene and optionally one or more diene monomer(s), and also known in the art as EPM or EPDM elastomers. EP elastomers have little to no crystallinity with a heat of fusion of 20 J/g or less, a density of 0.86 g/cm$^3$ or less, an ethylene content from 35 to 85 mol %, a diene content of 0 to 5 mol %, a minimum propylene content of 15 mol %, and a molecular weight of at least 50 kg/mol.

Suitable polyolefins may comprise up to 20 wt %, or up to 10%, or up to 1 wt % diene (i.e., diolefm) monomers. Examples include alpha-omega diene (i.e., di-vinyl) monomers such as 1,6-heptadiene, 1,7-octadiene, 1,8-nonadiene, 1,9-decadiene, 1,10-undecadiene, 1,11-dodecadiene, 1,12-tridecadiene, and 1,13-tetradecadiene, as well as cyclic dienes such as cyclopentadiene, vinylnorbornene, norbornadiene, ethylidene norbornene, divinylbenzene, and dicyclopentadiene.

Other suitable polyolefins are described in WO 03/040201, WO 03/040095, WO 03/040202, WO 03/040233, WO 2009/020706, and WO 03/040442.

The method of making the polyolefin is not critical, as it can be made by slurry, solution, gas phase, high pressure or other suitable processes, and by using catalyst systems appropriate for the polymerization of polyethylenes, such as chromium catalysts, metallocene-type catalysts, other appropriate catalyst systems or combinations thereof, or by free-radical polymerization. Catalyst systems suitable to make polyethylene are well known in the art; see, for example Metallocene-Based Polyolefins (Wiley & Sons, 2000).

In one or more embodiments, one or more of the ethylene/$C_3$-$C_{10}$ alpha olefin plasticizer components of the invention is present in an amount of from a low of 0.5 wt %, or 1 wt %, or 2 wt %, or 3 wt %, or 4 wt %, or 5 wt %, to a high of 50 wt %, or 45 wt %, or 40 wt %, or 35 wt %, or 30 wt %, or 25 wt %, or 20 wt %, or 15 wt %, or 10 wt %, or 5 wt %, based on total weight of plasticizer component(s) and polyolefin(s), wherein a desirable range can be any combination of any lower wt % limit with any upper wt % limit described herein provided the lower limit is less than the upper limit. In other embodiments, the composition includes the at least one ethylene/$C_3$-$C_{10}$ alpha olefin plasticizer in an amount of about 1 to 40 wt %, or 2 to 30 wt %, or 4 to 20 wt %, based on the total weight of the composition.

In one or more embodiments, one or more polyolefin component is present in an amount of from a low of 50 wt %, or 55 wt %, or 60 wt %, or 65 wt %, or 70 wt %, or 75 wt %, or 80 wt %, or 85 wt %, or 90 wt %, or 95 wt % to a high of 99 wt %, or 95 wt %, or 90 wt %, or 85 wt %, or 80 wt %, or 75 wt %, or 70 wt %, or 65 wt %, or 60 wt %, based on total weight of ethylene/$C_3$-$C_{10}$ alpha olefin plasticizer component(s) and polyolefin(s), wherein a desirable range can be any combination of any lower wt % limit with any upper wt % limit described herein provided the lower limit is less than the upper limit. In other embodiments, the composition includes at least one polyolefin in an amount of about 60 to 99 wt %, or 70 to 98 wt %, or 80 to 96 wt %, based on the total weight of the composition.

Additives commonly used in the polyolefin industry to impart certain desirable properties may be present in the polyolefin compositions of the present invention. Such additives are described in Plastics Additive Handbook, 5$^{th}$ Ed.; H. Zweifel, Ed. (Hanser-Gardner, 2001) and include antioxidants (including organic phosphites, hindered amines, and phenolics), stabilizers (including UV stabilizers and other UV absorbers), nucleating agents (including clarifying agents, metal salts such as sodium benzoate, sorbitol derivatives, and metal phosphates), pigments, dyes, color masterbatches, processing aids, waxes, oils, lubricants, surfactants, slip agents (including metal salts of fatty acids such as zinc stearate and fatty acid amides such erucamide), tackifiers, block, antiblock, neutralizers (such as hydro talcite), acid scavengers, anticorrosion agents, cavitating agents, blowing agents, quenchers, antistatic agents, fire retardants, cure or cross linking agents or systems (such as elemental sulfur, organo-sulfur compounds, organic peroxides, and di- or tri-amines), coupling agents (such as silane), and combinations thereof. The additives may be present in amounts known in the art to be effective, preferably at 0.01 to 10 wt % (100 to 100,000 ppm), or 0.02 to 1 wt % (200 to 10,000 ppm), or 0.025 to 0.5 wt % (250 to 5,000 ppm), or 0.05 to 0.25 wt % (500 to 2,500 ppm), or 0.1 to 5 wt % (1,000 to 50,000 ppm), based upon the weight of the composition (where ppm is parts-per-million by weight).

Fillers may be present in the polyolefin compositions of the present invention. Desirable fillers include but not limited to: natural or synthetic mineral aggregates (including talc, wollastonite, and calcium carbonate), fibers (including glass fibers, carbon fibers, or polymeric fibers), carbon black, graphite, natural and synthetic clays (including nanoclays and organoclays), sand, glass beads, and any other porous or nonporous fillers and supports known in the art, utilized alone or admixed to obtain desired properties. The filler may be present at 0.1 to 50 wt %, or 1 to 40 wt %, or 2 to 30 wt %, or 5 to 20 wt %, based on the weight of the total composition. Filler content is equated with the wt % ash content as determined by the ISO 3451-1 (A) test method. Blending The ethylene/$C_3$-$C_{10}$ alpha olefin plasticizer(s), polyolefin (s), and optional additives can be combined using any suitable means. Those skilled in the art will be able to determine the appropriate procedure to balance the need for intimate mixing with the desire for process economy. For example, one or more polyolefin component can be in the form of pellets or reactor granules, which are combined with the copolymer plasticizer(s) and optional additives by simple physical blending of constituent pellets and/or granules, since the forming of articles includes a (re)melting and mixing of the raw material(s). The polyolefin components may be in any physical form when blended with the ethylene/$C_3$-$C_{10}$ alpha olefin plasticizer(s) and optional additives. For example, they may be in the form of reactor granules (i.e., granules of polymer that are isolated from the polymerization reactor prior to any processing procedures), or in the form of pellets that are formed from melt extrusion of the reactor granules. The polyolefin(s), ethylene/$C_3$-$C_{10}$ alpha olefin plasticizer, and optional additives can be blended by any suitable means known to those skilled in the art such as, for example, the blending processes described in WO 2009/020706.

The compositions of the present invention can be useful for the fabrication of shaped articles made or formed by any useful discrete molding or continuous extrusion means for forming and shaping polyolefins known in the art, including: compression molding, injection molding, co-injection molding, gas-assisted injection molding, blow molding, multilayer blow molding, injection blow molding, stretch blow molding, extrusion blow molding, transfer molding; cast molding, rotational molding, foam molding, slush molding, transfer molding, wet lay-up or contact molding, cast molding, cold forming matched-die molding, thermoforming, vacuum forming, film blowing, film or sheet casting, sheet extrusion, profile extrusion or co-extrusion, fiber spinning, fiber spunbonding, fiber melt blowing, lamination, calendering, coating, pultrusion, protrusion, draw reduction, foaming, or other forms of processing such as described in, for example, Plastics Processing (Radian Corporation, Noyes Data Corp. 1986), or combinations thereof.

The plasticized compositions of the present invention can be useful for consumer goods, industrial goods, construction materials, packaging materials, appliance components, electrical components, and automotive components. Non-limiting examples of desirable articles of manufacture made from compositions of the invention include films, tapes, sheets, fibers, tubing, pipes, hoses, belts, coatings, fabrics (woven and nonwoven), tarps, agricultural barriers, packaging (durable and disposable), kitchen devices and household appliances (washing machines, refrigerators, blenders, air conditioners, etc.), furniture (indoor and outdoor, such as tables, chairs, benches, shelving, etc.), sporting equipment (skis, surfboards, skateboards, skates, boots, sleds, scooters, kayaks, paddles, etc.), solid wheels, stadium seating, amusement park rides, personal protective equipment (safety helmets, shin guards, etc.), emergency response equipment, cookware, utensils, trays, pallets, carts, tanks, tubs, pond liners, storage containers (crates, pails, jars, bottles, etc.), toys, child car seats and booster chairs, medical devices and components (including syringe parts and catheters), luggage, tool housings (for drills, saws, etc.), wire and cable jackets, electronics housings and components (for televisions, computers, phones, hand-held devices, media players, stereos, radios, clocks, etc.), building construction materials (flooring, siding, roofing, counter tops, seals, joints, isolators, etc.), lighting, gardening equipment (handles on shovels, wheelbarrows, etc.), playground equipment, motor housings, pump housings, battery housings, instrument housings, switches, knobs, buttons, handles, pet supplies, laboratory supplies, personal hygiene devices (razors, brushes, hairdryers, etc.), cleaning supplies (brooms, dust pans, etc.), musical instrument cases, statues, trophies, artwork, costume jewelry, picture frames, eyeglass frames, plant pots, and firearm components.

Plasticized polyolefin compositions of the present invention provide for improved plasticization durability of the plasticizer relative to comparable compositions made using conventional plasticizers. Improved plasticization durability is advantageous for successful long-term property retention. In certain embodiments, useful plasticized polyolefin compositions may exhibit a reduced TGA Volatility. Plasticized polyolefin compositions of the present invention provide for lower glass transition temperatures relative to comparable compositions made using a conventional plasticizer. A lower Tg is advantageous for improved low temperature flexibility and toughness. Plasticized polyolefin compositions of the present invention may also provide for lower melt viscosity relative to comparable compositions made using a conventional plasticizer. A lower melt viscosity (e.g., MI or MFR) is advantageous for improved low temperature flexibility and toughness.

EXAMPLES

The following examples are illustrative, but not limiting, of the methods and compositions of the present disclosure.

Examples 1-16 exemplify different copolymers comprising ethylene units and propylene units and processes for producing them. As shown, changes in the conditions and parameters of the process, such as the feed rate of various reactants, may be employed to achieve different characteristics of the resulting copolymer such as changing the crossover temperature of the copolymer.

Examples F1-F12 exemplify different functionalized copolymers and processes for producing the same.

Table 5 below summarizes the characteristics of the copolymer from select examples from below.

TABLE 5

| Example | Ethylene (mol %) | EEE (%) | PEE + EEP (%) | PEP (%) | EPE (%) | EPP + PPE (%) | PPP (%) | $N_{C2}$ | $T_{Crossover}$ (° C.) | Vinylidene (%) | Mn GPC (g/mol) | MW (g/mol) | PDI |
|---|---|---|---|---|---|---|---|---|---|---|---|---|---|
| 1 | 48.6 | 7.1 | 28.4 | 15.2 | 20.9 | 16.9 | 11.5 | 1.68 | −73.50 | 96.5 | 1159 | 4326 | 3.73 |
| 2 | 46.2 | 2.5 | 28.2 | 16.7 | 20.6 | 20.3 | 11.8 | 1.54 | −77.60 | 96.0 | 1466 | 3249 | 2.22 |
| 3 | 64.9 | 25.4 | 31.7 | 9.9 | 20.6 | 10.3 | 2.2 | 2.60 | −24.50 | 95.1 | 2085 | 7140 | 3.42 |
| 4 | 65.1 | 24.2 | 32.1 | 10.5 | 21.5 | 10.2 | 1.5 | 2.52 | −27.00 | 95.6 | 2326 | 7783 | 3.35 |
| 5 | 64.0 | 21.4 | 33.2 | 10.7 | 21.9 | 11.0 | 1.7 | 2.39 | −35.80 | 95.5 | 1241 | 3728 | 3.00 |
| 6 | 57.8 | 14.2 | 31.6 | 13.6 | 22.5 | 13.7 | 4.4 | 2.02 | −72.70 | 95.7 | 3202 | 6516 | 2.03 |
| 7 (Comparative) | 67.8 | 27.5 | 32.8 | 9.1 | 21.0 | 9.0 | 0.6 | 2.72 | −13.70 | 94.6 | 2838 | 5318 | 1.87 |
| 8 (Comparative) | 67.2 | 26.3 | 33.1 | 9.4 | 21.1 | 9.8 | 0.3 | 2.65 | −18.50 | 94.6 | 2269 | 4933 | 2.17 |
| 9 | 56.4 | 14.1 | 31.5 | 12.6 | 21.2 | 14.4 | 6.2 | 2.05 | <−37 | 94.9 | 3173 | 6948 | 2.19 |
| 10 | 55 | 22 | 28 | 9 | 17 | 12 | 13 | 2.60 | −22.4 | 76.6 | 2883 | 5901 | 2.05 |
| 11 | 62 | 18 | 33 | 12 | 22 | 12 | 2 | 2.22 | <−37 | 75.6 | 2318 | 4583 | 1.98 |
| 12 | 45 | 6 | 26 | 17 | 20 | 20 | 12 | 1.62 | <−37 | 81.2 | 2628 | 5260 | 2.00 |
| 13 | 54 | 12 | 32 | 12 | 21 | 15 | 8 | 1.99 | <−37 | 79.2 | 1673 | 3292 | 1.97 |
| 14 | 67 | 26 | 33 | 9 | 21 | 10 | 1 | 2.64 | −20 | 83 | 3004 | 6139 | 2.04 |
| 15 (Comparative) | 57 | 23 | 27 | 10 | 17 | 12 | 12 | 2.59 | 0.7 | 76.6 | 3000 | 6690 | 2.23 |
| 16 (Comparative) | 57 | 23 | 28 | 9 | 17 | 12 | 11 | 2.57 | −17.78 | 76.9 | 2331 | 5536 | 2.38 |

Example 1

A 300 mL Parr reactor was equipped with a water jacket for temperature control, a nitrogen-purged receiver for pressure control, a metered feed of ethylene gas and high-pressure metering pumps for separate feeds of propylene, toluene, catalyst and co-catalyst. The reaction was operated continuously; with continuous feed of catalyst (0.127 wt % $Cp_2ZrCl_2$ in toluene), co-catalyst (5.0 wt % MMAO in toluene), solvent (toluene), and ethylene and propylene monomers. The reactor was operated liquid-full at 70 psig and agitated with a four-blade pitched-turbine impeller operating at 220 rpm. The catalyst and co-catalyst solutions were mixed immediately before introduction to the reactor at feed rates of 0.90 g/min and 0.90 g/min, respectively. The ethylene, propylene and toluene were also mixed together and fed to the reactor separately from the catalyst and co-catalyst solutions at feed rates of 2.71 g/min, 15.22 g/min and 11.71 g/min, respectively. The reactor temperature was maintained at 65° C. as measured by a ⅛" thermocouple located in the reactor. The production rate of polymer was measured gravimetrically as 2.78 g/min.

The copolymer was found to contain 49 mol % of ethylene units using $^1$H-NMR. The relative number average molecular weight ($M_n$) and PDI of the copolymer were measured by GPC and found to be 1159 g/mol and 3.73, respectively. The weight average molecular weight ($M_w$) of the copolymer was measured by $^1$H-NMR and found to be 1038 g/mol and the olefin distribution in the copolymer as measured by $^1$H-NMR was 96.5% methyl-vinylidene, 1.6% beta-vinylidene, 1.3% di-substituted (i.e. 2 olefins in a single copolymer molecule) and 0.6% vinyl/allyl. The average ethylene unit run length as measured by $^{13}$C-NMR was 1.68. The crossover temperature measured by oscillatory rheometry was determined to be −73.5° C.

Example 2

A 300 mL Parr reactor was equipped with a water jacket for temperature control, a nitrogen-purged receiver for pressure control, a metered feed of ethylene gas and high-pressure metering pumps for separate feeds of propylene, toluene, catalyst and co-catalyst. The reactor was operated continuously; with a continuous feed of catalyst (0.127 wt % $Cp_2ZrCl_2$ in toluene), co-catalyst (5.0 wt % MMAO in toluene), solvent (toluene), ethylene and propylene. The reactor was operated liquid-full at 70 psig and agitated with a four-blade pitched-turbine impeller operating at 220 rpm. The catalyst and co-catalyst solutions were mixed immediately before introduction to the reactor at feed rates of 0.87 g/min and 0.87 g/min, respectively. The ethylene, propylene and toluene were also mixed together and fed to the reactor separately from the catalyst and co-catalyst solutions at feed rates of 2.78 g/min, 15.51 g/min and 10.65 g/min, respectively. The reactor temperature was maintained at 68° C. as measured by a ⅛" thermocouple located in the reactor. The production rate of polymer was measured gravimetrically as 3.22 g/min.

The copolymer was found to contain 46 mol % ethylene units as measured by $^1$H-NMR. The relative number average molecular weight ($M_n$) and PDI of the copolymer, as measured by GPC were 1466 g/mol and 2.22, respectively. The weight average molecular weight ($M_w$) of the copolymer as measured by $^1$H-NMR was 780 g/mol and the olefin distribution in the copolymer measured by $^1$H-NMR was 96.0% methyl-vinylidene, 1.8% beta-vinylidene, 1.3% di-substituted and 0.9% vinyl/allyl. The average ethylene unit run length measured by $^{13}$C-NMR was 1.54. The crossover temperature measured by oscillatory rheometry was determined to be −77.6° C.

Example 3

A 300 mL Parr reactor was equipped with a water jacket for temperature control, a nitrogen-purged receiver for pressure control, a metered feed of ethylene gas and high-pressure metering pumps for separate feeds of propylene, toluene, catalyst and co-catalyst. The reaction was operated continuously; with continuous feed of catalyst (0.077 wt % $Cp_2ZrCl_2$ in toluene), co-catalyst (1.248 wt % MMAO in toluene), solvent (toluene), ethylene, and propylene. The reactor was operated liquid-full at 763 psig and agitated with a four-blade pitched-turbine impeller operating at 900 rpm. The catalyst and co-catalyst solutions were mixed immediately before introduction to the reactor at feed rates of 1.02 g/min and 0.82 g/min, respectively. The ethylene, propylene and toluene were also mixed together and fed to the reactor separately from the catalyst and co-catalyst solutions at feed rates of 2.23 g/min, 3.30 g/min and 9.31 g/min, respectively. The reactor temperature was maintained at 76° C. as measured by a ⅛" thermocouple in the reactor. The production rate of copolymer was measured gravimetrically as 3.57 g/min.

The copolymer was found to contain 65 mol % ethylene as measured by $^1$H-NMR. The relative number average molecular weight (Mn) and PDI of the copolymer, as measured by GPC were 2085 g/mol and 3.42, respectively. The weight average molecular weight (Mw) of the copolymer as measured by $^1$H-NMR was 1645 g/mol and the olefin distribution in the copolymer measured by $^1$H-NMR was 95.1% methyl-vinylidene, 1.8% beta-vinylidene, 1.3% di-substituted and 1.8% vinyl/allyl. The average ethylene unit run length measured by $^{13}$C-NMR was 2.60. The crossover temperature measured by oscillatory rheometry was −24.5° C.

Example 4

A 300 mL Parr reactor was equipped with a water jacket for temperature control, a nitrogen-purged receiver for pressure control, a metered feed of ethylene gas and high-pressure metering pumps for separate feeds of propylene, toluene, catalyst and co-catalyst. The reaction was operated continuously; with continuous feed of catalyst (0.075 wt % $Cp_2ZrCl_2$ in toluene), co-catalyst (1.0 wt % MMAO in toluene), solvent (toluene), ethylene, and propylene. The reactor was operated liquid-full at 708 psig and agitated with a four-blade pitched-turbine impeller operating at 1,000 rpm. The catalyst and co-catalyst solutions were mixed immediately before introduction to the reactor at feed rates of 0.89 g/min and 0.91 g/min, respectively. The ethylene, propylene and toluene were also mixed together and fed to the reactor separately from the catalyst and co-catalyst solutions at feed rates of 2.23 g/min, 3.59 g/min and 9.36 g/min, respectively. The reactor temperature was maintained at 75° C. as measured by a ⅛" thermocouple in the reactor. The production rate of copolymer was measured gravimetrically as 3.47 g/min.

The copolymer was found to contain 65 mol % ethylene as measured by $^1$H-NMR. The relative number average molecular weight (Mn) and PDI of the copolymer, as measured by GPC were 2326 g/mol and 3.35, respectively. The weight average molecular weight (Mw) of the copolymer as measured by $^1$H-NMR was 1824 g/mol and the olefin distribution in the copolymer measured by $^1$H-NMR was 95.6% methyl-vinylidene, 1.7% beta-vinylidene, 1.1% di-substituted and 1.6% vinyl/allyl. The average ethylene unit run length measured by $^{13}$C-NMR was 2.52. The crossover temperature measured by oscillatory rheometry was −27.0° C.

Example 5

A 300 mL Parr reactor was equipped with a water jacket for temperature control, a nitrogen-purged receiver for pressure control, a metered feed of ethylene gas and high-pressure metering pumps for separate feeds of propylene, toluene, catalyst and co-catalyst. The reaction was operated continuously; with continuous feed of catalyst (0.150 wt % $Cp_2ZrCl_2$ in toluene), co-catalyst (2.0 wt % MMAO in toluene), solvent (toluene), ethylene, and propylene. The reactor was operated liquid-full at 715 psig and agitated with a four-blade pitched-turbine impeller operating at 1,000 rpm. The catalyst and co-catalyst solutions were mixed immediately before introduction to the reactor at feed rates of 1.28 g/min and 1.26 g/min, respectively. The ethylene, propylene and toluene were also mixed together and fed to the reactor separately from the catalyst and co-catalyst solutions at feed rates of 2.23 g/min, 2.60 g/min and 9.38 g/min, respectively. The reactor temperature was maintained at 75° C. as measured by a ⅛" thermocouple in the reactor. The production rate of copolymer was measured gravimetrically as 3.4 g/min.

The copolymer was found to contain 64 mol % ethylene as measured by $^1$H-NMR. The relative number average molecular weight (Mn) and PDI of the copolymer, as measured by GPC were 1241 g/mol and 3.00, respectively. The weight average molecular weight (Mw) of the copolymer as measured by $^1$H-NMR was 1114 g/mol and the olefin distribution in the copolymer measured by $^1$H-NMR was 95.5% methyl-vinylidene, 1.9% beta-vinylidene, 1.3% di-substituted and 1.4% vinyl/allyl. The average ethylene unit run length measured by $^{13}$C-NMR was 2.39. The crossover temperature measured by oscillatory rheometry was −35.8° C.

Example 6

A 300 mL Parr reactor was equipped with a water jacket for temperature control, a nitrogen-purged receiver for pressure control, a metered feed of ethylene gas and high-pressure metering pumps for separate feeds of propylene, toluene, catalyst and co-catalyst. The reaction was operated continuously; with continuous feed of catalyst (0.167 wt % Cp$_2$ZrCl$_2$ in toluene), co-catalyst (2.222 wt % MMAO in toluene), solvent (toluene), ethylene, and propylene. The reactor was operated liquid-full at 696 psig and agitated with a four-blade pitched-turbine impeller operating at 1,000 rpm. The catalyst and co-catalyst solutions were mixed immediately before introduction to the reactor at feed rates of 0.66 g/min and 0.65 g/min, respectively. The ethylene, propylene and toluene were also mixed together and fed to the reactor separately from the catalyst and co-catalyst solutions at feed rates of 3.09 g/min, 8.11 g/min and 3.10 g/min, respectively. The reactor temperature was maintained at 80° C. as measured by a ⅛" thermocouple in the reactor. The production rate of copolymer was measured gravimetrically as 6.63 g/min.

The copolymer was found to contain 58 mol % ethylene as measured by $^1$H-NMR. The relative number average molecular weight (Mn) and PDI of the copolymer, as measured by GPC were 3202 g/mol and 2.03, respectively. The weight average molecular weight (Mw) of the copolymer as measured by $^1$H-NMR was 1310 g/mol and the olefin distribution in the copolymer measured by $^1$H-NMR was 95.7% methyl-vinylidene, 1.5% beta-vinylidene, 1.6% di-substituted and 1.2% vinyl/allyl. The average ethylene unit run length measured by $^{13}$C-NMR was 2.02. The crossover temperature measured by oscillatory rheometry was approximately −72.7° C.

Example 7 (Comparative)

A 300 mL Parr reactor was equipped with a water jacket for temperature control, a nitrogen-purged receiver for pressure control, a metered feed of ethylene gas and high-pressure metering pumps for separate feeds of propylene, toluene, catalyst and co-catalyst. The reaction was operated continuously; with continuous feed of catalyst (0.165 wt % Cp$_2$ZrCl$_2$ in toluene), co-catalyst (2.2 wt % MMAO in toluene), solvent (toluene), ethylene, and propylene. The reactor was operated liquid-full at 703 psig and agitated with a four-blade pitched-turbine impeller operating at 1,000 rpm. The catalyst and co-catalyst solutions were mixed immediately before introduction to the reactor at feed rates of 1.21 g/min and 1.20 g/min, respectively. The ethylene, propylene and toluene were also mixed together and fed to the reactor separately from the catalyst and co-catalyst solutions at feed rates of 2.23 g/min, 2.51 g/min and 8.50 g/min, respectively. The reactor temperature was maintained at 75° C. as measured by a ⅛" thermocouple in the reactor. The production rate of copolymer was measured gravimetrically as 3.48 g/min.

The copolymer was found to contain 68 mol % ethylene as measured by $^1$H-NMR. The relative number average molecular weight (Mn) and PDI of the copolymer, as measured by GPC were 2838 g/mol and 1.87, respectively. The weight average molecular weight (Mw) of the copolymer as measured by $^1$H-NMR was 1203 g/mol and the olefin distribution in the copolymer measured by $^1$H-NMR was 94.6% methyl-vinylidene, 2.1% beta-vinylidene, 1.3% di-substituted and 2.0% vinyl/allyl. The average ethylene unit run length measured by $^{13}$C-NMR was 2.72. The crossover temperature measured by oscillatory rheometry was approximately −13.7° C.

Example 8 (Comparative)

A 300 mL Parr reactor was equipped with a water jacket for temperature control, a nitrogen-purged receiver for pressure control, a metered feed of ethylene gas and high-pressure metering pumps for separate feeds of propylene, toluene, catalyst and co-catalyst. The reaction was operated continuously; with continuous feed of catalyst (0.182 wt % Cp$_2$ZrCl$_2$ in toluene), co-catalyst (2.42 wt % MMAO in toluene), solvent (toluene), ethylene, and propylene. The reactor was operated liquid-full at 704 psig and agitated with a four-blade pitched-turbine impeller operating at 1,000 rpm. The catalyst and co-catalyst solutions were mixed immediately before introduction to the reactor at feed rates of 1.15 g/min and 1.14 g/min, respectively. The ethylene, propylene and toluene were also mixed together and fed to the reactor separately from the catalyst and co-catalyst solutions at feed rates of 2.20 g/min, 2.40 g/min and 7.97 g/min, respectively. The reactor temperature was maintained at 75° C. as measured by a ⅛" thermocouple in the reactor. The production rate of copolymer was measured gravimetrically as 3.53 g/min.

The copolymer was found to contain 67 mol % ethylene as measured by $^1$H-NMR. The relative number average molecular weight (Mn) and PDI of the copolymer, as measured by GPC were 2269 g/mol and 2.17, respectively. The weight average molecular weight (Mw) of the copolymer as measured by $^1$H-NMR was 1167 g/mol and the olefin distribution in the copolymer measured by $^1$H-NMR was 94.6% methyl-vinylidene, 2.2% beta-vinylidene, 1.3% di-substituted and 1.9% vinyl/allyl. The average ethylene unit run length measured by $^{13}$C-NMR was 2.65. The crossover temperature measured by oscillatory rheometry was approximately −18.5° C.

Example 9

A 300 mL Parr reactor was equipped with a water jacket for temperature control, a nitrogen-purged receiver for pressure control, a metered feed of ethylene gas and high-pressure metering pumps for separate feeds of propylene, toluene, catalyst and co-catalyst. The reaction was operated continuously; with continuous feed of catalyst (0.167 wt % Cp$_2$ZrCl$_2$ in toluene), co-catalyst (2.222 wt % MMAO in toluene), solvent (toluene), ethylene, and propylene. The reactor was operated liquid-full at 701 psig and agitated with a four-blade pitched-turbine impeller operating at 1,000 rpm. The catalyst and co-catalyst solutions were mixed immediately before introduction to the reactor at feed rates of 0.78 g/min and 0.89 g/min, respectively. The ethylene, propylene and toluene were also mixed together and fed to the reactor separately from the catalyst and co-catalyst solutions at feed rates of 3.34 g/min, 7.77 g/min and 3.20 g/min, respectively. The reactor temperature was maintained at 89° C. as measured by a ⅛" thermocouple in the reactor. The production rate of copolymer was measured gravimetrically as 7.98 g/min.

The copolymer was found to contain 56 mol % ethylene as measured by $^1$H-NMR. The relative number average molecular weight (Mn) and PDI of the copolymer, as measured by GPC were 3173 g/mol and 6948, respectively. The weight average molecular weight (Mw) of the copolymer as measured by $^1$H-NMR was 1281 g/mol and the olefin distribution in the copolymer measured by $^1$H-NMR was 94.9% methyl-vinylidene, 2.0% beta-vinylidene, 1.8% di-substituted and 1.3% vinyl/allyl. The average ethylene unit run length measured by $^{13}$C-NMR was 2.05. The crossover temperature measured by oscillatory rheometry was lower than −37° C.

Example 10

A 100 mL Parr reactor was equipped with a water jacket for temperature control, a nitrogen-purged receiver for pressure control, a metered feed of ethylene gas and high-pressure metering pumps for separate feeds of propylene, toluene, catalyst, co-catalyst and scavenger. The reaction was operated continuously; with continuous feed of catalyst (0.011 wt % Cp$_2$ZrMe$_2$ in toluene), co-catalyst (0.023 wt % FAB in toluene), scavenger (0.0080 wt % TEAL in toluene), solvent (toluene), ethylene, and propylene. The reactor was operated liquid-full at 1520 psig and agitated with a four-blade pitched-turbine impeller operating at 1041 rpm. The catalyst, co-catalyst and scavenger solutions were mixed immediately before introduction to the reactor at feed rates of 0.31, 0.32 and 0.52 g/min, respectively. The ethylene, propylene and toluene were also mixed together and fed to the reactor separately from the catalyst, co-catalyst and scavenger solutions at feed rates of 0.60, 2.98 and 6.31 g/min, respectively. The reactor temperature was maintained at 134° C. as measured by a ⅛" thermocouple in the reactor. The production rate of copolymer was measured gravimetrically as 0.96 g/min.

The copolymer was found to contain 55 mol % ethylene as measured by $^1$H-NMR. The relative number average molecular weight (Mn) and PDI of the copolymer, as measured by GPC were 2883 g/mol and 2.05, respectively. The weight average molecular weight (Mw) of the copolymer as measured by $^1$H-NMR was 1411 g/mol and the olefin distribution in the copolymer measured by $^1$H-NMR was 76.6% methyl-vinylidene, 14.1% beta-vinylidene, 7.2% di-substituted and 2.1% vinyl/allyl. The average ethylene unit run length measured by $^{13}$C-NMR was 2.60. The crossover temperature measured by oscillatory rheometry was approximately −22.4° C.

Example 11

A 100 mL Parr reactor was equipped with a water jacket for temperature control, a nitrogen-purged receiver for pressure control, a metered feed of ethylene gas and high-pressure metering pumps for separate feeds of propylene, toluene, catalyst, co-catalyst and scavenger. The reaction was operated continuously; with continuous feed of catalyst (0.141 wt % Cp$_2$ZrMe$_2$ in toluene), co-catalyst (0.144 wt % FAB in toluene), scavenger (0.032 wt % TEAL in toluene), solvent (toluene), ethylene, and propylene. The reactor was operated liquid-full at 1553 psig and agitated with a four-blade pitched-turbine impeller operating at 1,000 rpm. The catalyst, co-catalyst and scavenger solutions were mixed immediately before introduction to the reactor at feed rates of 0.22 g/min, 0.49 g/min and 0.25 g/min, respectively. The ethylene, propylene and toluene were also mixed together and fed to the reactor separately from the catalyst, co-catalyst and scavenger solutions at feed rates of 1.75 g/min, 2.55 g/min and 7.04 g/min, respectively. The reactor temperature was maintained at 120° C. as measured by a ⅛" thermocouple in the reactor. The production rate of copolymer was measured gravimetrically as 2.53 g/min.

The copolymer was found to contain 62 mol % ethylene as measured by $^1$H-NMR. The relative number average molecular weight (Mn) and PDI of the copolymer, as measured by GPC were 2318 g/mol and 1.98, respectively. The weight average molecular weight (Mw) of the copolymer as measured by $^1$H-NMR was 1199 g/mol and the olefin distribution in the copolymer measured by $^1$H-NMR was 75.6% methyl-vinylidene, 16.8% beta-vinylidene, 6.3% di-substituted and 1.4% vinyl/allyl. The average ethylene unit run length measured by $^{13}$C-NMR was 2.22. The crossover temperature measured by oscillatory rheometry was lower than −37° C.

Example 12

A 100 mL Parr reactor was equipped with a water jacket for temperature control, a nitrogen-purged receiver for pressure control, a metered feed of ethylene gas and high-pressure metering pumps for separate feeds of propylene, toluene, catalyst, co-catalyst and scavenger. The reaction was operated continuously; with continuous feed of catalyst (0.04 wt % Cp$_2$ZrMe$_2$ in toluene), co-catalyst (0.083 wt % FAB in toluene), scavenger (0.005 wt % TEAL in toluene), solvent (toluene), ethylene, and propylene. The reactor was operated liquid-full at 1533 psig and agitated with a four-blade pitched-turbine impeller operating at 1,000 rpm. The catalyst, co-catalyst and scavenger solutions were mixed immediately before introduction to the reactor at feed rates of 0.32 g/min, 0.34 g/min and 0.33 g/min, respectively. The ethylene, propylene and toluene were also mixed together and fed to the reactor separately from the catalyst, co-catalyst and scavenger solutions at feed rates of 1.60 g/min, 3.05 g/min and 3.68 g/min, respectively. The reactor temperature was maintained at 98° C. as measured by a ⅛" thermocouple in the reactor. The production rate of copolymer was measured gravimetrically as 3.69 g/min.

The copolymer was found to contain 45 mol % ethylene as measured by $^1$H-NMR. The relative number average molecular weight (Mn) and PDI of the copolymer, as measured by GPC were 2628 g/mol and 2.00, respectively. The weight average molecular weight (Mw) of the copolymer as measured by $^1$H-NMR was 1410 g/mol and the olefin distribution in the copolymer measured by $^1$H-NMR was 81.2% methyl-vinylidene, 13.0% beta-vinylidene, 5.2% di-substituted and 0.6% vinyl/allyl. The average ethylene unit run length measured by $^{13}$C-NMR was 1.62. The crossover temperature measured by oscillatory rheometry was lower than −37° C.

Example 13

A 100 mL Parr reactor was equipped with a water jacket for temperature control, a nitrogen-purged receiver for pressure control, a metered feed of ethylene gas and high-pressure metering pumps for separate feeds of propylene, toluene, catalyst, co-catalyst and scavenger. The reaction was operated continuously; with continuous feed of catalyst (0.04 wt % $Cp_2ZrMe_2$ in toluene), co-catalyst (0.082 wt % FAB in toluene), scavenger (0.01 wt % TEAL in toluene), solvent (toluene), ethylene, and propylene. The reactor was operated liquid-full at 1533 psig and agitated with a four-blade pitched-turbine impeller operating at 1019 rpm. The catalyst, co-catalyst and scavenger solutions were mixed immediately before introduction to the reactor at feed rates of 0.52 g/min, 0.52 g/min and 0.37 g/min, respectively. The ethylene, propylene and toluene were also mixed together and fed to the reactor separately from the catalyst, co-catalyst and scavenger solutions at feed rates of 1.78 g/min, 2.76 g/min and 3.98 g/min, respectively. The reactor temperature was maintained at 119° C. as measured by a ⅛" thermocouple in the reactor. The production rate of copolymer was measured gravimetrically as 3.5 g/min.

The copolymer was found to contain 54 mol. % ethylene as measured by $^1$H-NMR. The relative number average molecular weight (Mn) and PDI of the copolymer, as measured by GPC were 1673 g/mol and 1.97, respectively. The weight average molecular weight (Mw) of the copolymer as measured by $^1$H-NMR was 913 g/mol and the olefin distribution in the copolymer measured by $^1$H-NMR was 79.2% methyl-vinylidene, 14.7% beta-vinylidene, 5.0% di-substituted and 1.1% vinyl/allyl. The average ethylene unit run length measured by $^{13}$C-NMR was 1.99. The crossover temperature measured by oscillatory rheometry was lower than −37° C.

Example 14

A 100 mL Parr reactor was equipped with a water jacket for temperature control, a nitrogen-purged receiver for pressure control, a metered feed of ethylene gas and high-pressure metering pumps for separate feeds of propylene, toluene, catalyst, co-catalyst and scavenger. The reaction was operated continuously; with continuous feed of catalyst (0.093 wt % $Cp_2ZrMe_2$ in toluene), co-catalyst (0.191 wt % FAB in toluene), scavenger (0.011 wt % TEAL in toluene), solvent (toluene), ethylene, and propylene. The reactor was operated liquid-full at 1462 psig and agitated with a four-blade pitched-turbine impeller operating at 1,000 rpm. The catalyst, co-catalyst and scavenger solutions were mixed immediately before introduction to the reactor at feed rates of 0.65 g/min, 0.68 g/min and 0.63 g/min, respectively. The ethylene, propylene and toluene were also mixed together and fed to the reactor separately from the catalyst, co-catalyst and scavenger solutions at feed rates of 1.70 g/min, 2.20 g/min and 6.85 g/min, respectively. The reactor temperature was maintained at 105° C. as measured by a ⅛" thermocouple in the reactor. The production rate of copolymer was measured gravimetrically as 2.63 g/min.

The copolymer was found to contain 67 mol. % ethylene as measured by $^1$H-NMR. The relative number average molecular weight (Mn) and PDI of the copolymer, as measured by GPC were 3004 g/mol and 2.04, respectively. The weight average molecular weight (Mw) of the copolymer as measured by $^1$H-NMR was 1504 g/mol and the olefin distribution in the copolymer measured by $^1$H-NMR was 83.0% methyl-vinylidene, 11.0% beta-vinylidene, 5.0% di-substituted and 2.0% vinyl/allyl. The average ethylene unit run length measured by $^{13}$C-NMR was 2.64. The crossover temperature measured by oscillatory rheometry was approximately −20.0° C.

Example 15 (Comparative)

A 100 mL Parr reactor was equipped with a water jacket for temperature control, a nitrogen-purged receiver for pressure control, a metered feed of ethylene gas and high-pressure metering pumps for separate feeds of propylene, toluene, catalyst, co-catalyst and scavenger. The reaction was operated continuously; with continuous feed of catalyst (0.008 wt % $Cp_2ZrMe_2$ in toluene), co-catalyst (0.015 wt % FAB in toluene), scavenger (0.011 wt % TEAL in toluene), solvent (toluene), ethylene, and propylene. The reactor was operated liquid-full at 1549 psig and agitated with a four-blade pitched-turbine impeller operating at 1008 rpm. The catalyst, co-catalyst and scavenger solutions were mixed immediately before introduction to the reactor at feed rates of 0.37 g/min, 0.40 g/min and 0.27 g/min, respectively. The ethylene, propylene and toluene were also mixed together and fed to the reactor separately from the catalyst, co-catalyst and scavenger solutions at feed rates of 0.48 g/min, 3.0 g/min and 6.98 g/min, respectively. The reactor temperature was maintained at 140° C. as measured by a ⅛" thermocouple in the reactor. The production rate of copolymer was measured gravimetrically as 0.61 g/min.

The copolymer was found to contain 57 mol. % ethylene as measured by $^1$H-NMR. The relative number average molecular weight (Mn) and PDI of the copolymer, as measured by GPC were 3,000 g/mol and 2.23, respectively. The weight average molecular weight (Mw) of the copolymer as measured by $^1$H-NMR was 1505 g/mol and the olefin distribution in the copolymer measured by $^1$H-NMR was 76.6% methyl-vinylidene, 13.7% beta-vinylidene, 7.6% di-substituted and 2.1% vinyl/allyl. The average ethylene unit run length measured by $^{13}$C-NMR was 2.59. The crossover temperature measured by oscillatory rheometry was approximately 0.7° C.

Example 16 (Comparative)

A 100 mL Parr reactor was equipped with a water jacket for temperature control, a nitrogen-purged receiver for pressure control, a metered feed of ethylene gas and high-pressure metering pumps for separate feeds of propylene, toluene, catalyst, co-catalyst and scavenger. The reaction was operated continuously; with continuous feed of catalyst (0.015 wt % $Cp_2ZrMe_2$ in toluene), co-catalyst (0.031 wt % FAB in toluene), scavenger (0.009 wt % TEAL in toluene), solvent (toluene), ethylene, and propylene. The reactor was operated liquid-full at 1539 psig and agitated with a four-blade pitched-turbine impeller operating at 1001 rpm. The catalyst, co-catalyst and scavenger solutions were mixed immediately before introduction to the reactor at feed rates of 0.26 g/min, 0.26 g/min and 0.46 g/min, respectively. The ethylene, propylene and toluene were also mixed together and fed to the reactor separately from the catalyst, co-catalyst and scavenger solutions at feed rates of 0.52 g/min, 3.04 g/min and 6.62 g/min, respectively. The reactor temperature was maintained at 140° C. as measured by a ⅛" thermocouple in the reactor. The production rate of copolymer was measured gravimetrically as 0.64 g/min.

The copolymer was found to contain 57 mol. % ethylene as measured by $^1$H-NMR. The relative number average molecular weight (Mn) and PDI of the copolymer, as measured by GPC were 2331 g/mol and 2.38, respectively. The weight average molecular weight (Mw) of the copolymer as measured by $^1$H-NMR was 1197 g/mol and the olefin distribution in the copolymer measured by $^1$H-NMR was 76.9% methyl-vinylidene, 14.4% beta-vinylidene, 6.9% di-substituted and 1.8% vinyl/allyl. The average ethylene unit run length measured by $^{13}$C-NMR was 2.57. The crossover temperature measured by oscillatory rheometry was approximately −17.8° C.

Examples and Comparative Examples for Ethylene Alpha Olefin Copolymer Functionalization

Example F1

Ethylene propylene copolymer (Example 1) 168.5 g (0.16 mol) and maleic anhydride 23.5 g (0.24 mol) were charged to a 350 mL PARR pressure reactor equipped with a stirrer and a thermocouple. The reaction mixture was heated to 50° C., purged with nitrogen for 15 min with stirring. The reactor temperature was raised to 235° C. and maintained at that temperature for 6 h while stirring. The reaction mixture was then cooled to 90° C. and transferred to a 500 mL round bottom flask. The reaction mixture was then heated and the unreacted maleic anhydride was removed in vacuo. Analytical analysis: acid number: 0.966 and 91.0% functionalized copolymer.

Example F2

Ethylene propylene copolymer (Example 2) 150 g (0.19 mol) and maleic anhydride 28.3 g (0.29 mol) were charged to a 350 mL PARR pressure reactor equipped with a stirrer and a thermocouple. The reaction mixture was heated to 50° C., purged with nitrogen for 15 min with stirring. The reactor temperature was raised to 235° C. and maintained at that temperature for 6 h while stirring. The reaction mixture was then cooled to 90° C. and transferred to a 500 mL round bottom flask. The reaction mixture was then heated and the unreacted maleic anhydride was removed in vacuo. Analytical analysis: acid number: 1.24 and 91.6% functionalized copolymer.

Example F3

Ethylene propylene copolymer (Example 3) 822.5 g (0.5 mol) and maleic anhydride 73.55 g (0.75 mol) were charged to a 2 L PARR pressure reactor equipped with a stirrer and a thermocouple. The reaction mixture was heated to 50° C., purged with nitrogen for 15 min with stirring. The reactor temperature was raised to 235° C. and maintained at that temperature for 6 h while stirring. The reaction mixture was then cooled to 90° C. and transferred to a 2 L round bottom flask. The reaction mixture was then heated and the unreacted maleic anhydride was removed in vacuo affording 827.5 g of product. Analytical analysis: acid number: 0.577 and 85.4% functionalized copolymer.

Example F4

Ethylene propylene copolymer (Example 4) 900 g (0.49 mol) and maleic anhydride 72.65 g (0.74 mol) were charged to a 2 L PARR pressure reactor equipped with a stirrer and a thermocouple. The reaction mixture was heated to 50° C., purged with nitrogen for 15 min with stirring. The reactor temperature was raised to 235° C. and maintained at that temperature for 6 h while stirring. The reaction mixture was then cooled to 90° C. and transferred to a 2 L round bottom flask. The reaction mixture was then heated and the unreacted maleic anhydride was removed in vacuo affording 901.4 g of product. Analytical analysis: acid number: 0.571 and 84.8% functionalized copolymer.

Example F5

Ethylene propylene copolymer (Example 5) 781 g (0.7 mol) and maleic anhydride 103.1 g (1.05 mol) were charged to a 2 L PARR pressure reactor equipped with a stirrer and a thermocouple. The reaction mixture was heated to 50° C., purged with nitrogen for 15 min with stirring. The reactor temperature was raised to 235° C. and maintained at that temperature for 6 h while stirring. The reaction mixture was then cooled to 90° C. and transferred to a 1 L round bottom flask. The reaction mixture was then heated and the unreacted maleic anhydride was removed in vacuo affording 846.5 g of product. Analytical analysis: acid number: 0.986, and 88.6% functionalized copolymer.

Example F6

Ethylene propylene copolymer (Example 6 1,000 g (0.76 mol) and maleic anhydride 112.3 g (1.15 mol) were charged to a 2 L PARR pressure reactor equipped with a stirrer and a thermocouple. The reaction mixture was heated to 50° C., purged with nitrogen for 15 min with stirring. The reactor temperature was raised to 235° C. and maintained at that temperature for 6 h while stirring. The reaction mixture was then cooled to 90° C. and transferred to a 2 L round bottom flask. The reaction mixture was then heated and the unreacted maleic anhydride was removed in vacuo affording 1076.8 g of product. Analytical analysis: acid number: 0.76, and 78% functionalized copolymer.

Example F7 (Comparative)

Ethylene propylene copolymer (Example 7) 450 g (0.374 mol), ethylene propylene copolymer (Example 8) 450 g (0.386 mol) and maleic anhydride 111.79 g (1.14 mol) were charged to a 2 L PARR pressure reactor equipped with a stirrer and a thermocouple. The reaction mixture was heated to 50° C., purged with nitrogen for 15 min with stirring. The reactor temperature was raised to 235° C. and maintained at that temperature for 6 h while stirring. The reaction mixture was then cooled to 90° C. and transferred to a 2 L round bottom flask. The reaction mixture was then heated and the unreacted maleic anhydride was removed in vacuo affording 960.2 g of product. Analytical analysis: acid number: 0.923, and 87.0% functionalized copolymer.

Example F8

Ethylene propylene copolymer (Example 9) 845.2 g (0.66 mol) and maleic anhydride 97.0 g (0.99 mol) were charged to a 2 L PARR pressure reactor equipped with a stirrer and a thermocouple. The reaction mixture was heated to 50° C., purged with nitrogen for 15 min with stirring. The reactor temperature was raised to 235° C. and maintained at that temperature for 6 h while stirring. The reaction mixture was then cooled to 90° C. and transferred to a 2 L 3N-round bottom flask. The reaction mixture was then heated and the unreacted maleic anhydride was removed in vacuo affording 904.2 g of product. Analytical analysis: acid number: 0.858, and 82.2% functionalized copolymer.

Example F9

Ethylene propylene copolymer (Example 10) 150.0 g (0.11 mol) and maleic anhydride 15.7 g (0.159 mol) were charged to a 35 0 mL PARR pressure reactor equipped with a stirrer and a thermocouple. The reaction mixture was heated to 50° C., purged with nitrogen for 15 min with stirring. The reactor temperature was raised to 235° C. and maintained at that temperature for 6 h while stirring. The reaction mixture was then cooled to 90° C. and transferred to a 500 mL 3N-round bottom flask. The reaction mixture was then heated and the unreacted maleic anhydride was removed in vacuo affording 155.3 g of product. Analytical analysis: acid number: 0.72, and 85.6% functionalized copolymer.

Example F10

Ethylene propylene copolymer (Example 11) 150.0 g (0.125 mol) and maleic anhydride 18.4 g (0.19 mol) were charged to a 350 mL PARR pressure reactor equipped with a stirrer and a thermocouple. The reaction mixture was heated to 50° C., purged with nitrogen for 15 min with stirring. The reactor temperature was raised to 235° C. and maintained at that temperature for 6 h while stirring. The reaction mixture was then cooled to 90° C. and transferred to a 500 mL 3N-round bottom flask. The reaction mixture was then heated and the unreacted maleic anhydride was removed in vacuo affording 159.5 g of product. Analytical analysis: acid number: 0.78, and 81.3% functionalized copolymer.

Example F11

Ethylene propylene copolymer (Example 12) 150.0 g (0.11 mol) and maleic anhydride 15.7 g (0.160 mol) were charged to a 350 mL PARR pressure reactor equipped with a stirrer and a thermocouple. The reaction mixture was heated to 50° C., purged with nitrogen for 15 min with stirring. The reactor temperature was raised to 235° C. and maintained at that temperature for 6 h while stirring. The reaction mixture was then cooled to 90° C. and transferred to a 500 mL 3N-round bottom flask. The reaction mixture was then heated and the unreacted maleic anhydride was removed in vacuo affording 155.6 g of product. Analytical analysis: acid number: 0.685, and 85.3% functionalized copolymer.

Example F12

Ethylene propylene copolymer (Example 13) 1,000 g (1.1 mol) and maleic anhydride 161.2 g (1.64 mol) were charged to a 2 L PARR pressure reactor equipped with a stirrer and a thermocouple. The reaction mixture was heated to 50 C, purged with nitrogen for 15 min with stirring. The reactor temperature was raised to 235° C. and maintained at that temperature for 6 h while stirring. The reaction mixture was then cooled to 90° C. and transferred to a 500 mL 3N-round bottom flask. The reaction mixture was then heated and the unreacted maleic anhydride was removed in vacuo affording 1108.5 g of product. Analytical analysis: acid number: 1.057, and 83.8% functionalized copolymer While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When the word "about" is used herein in reference to a number, it should be understood that still another embodiment of the invention includes that number not modified by the presence of the word "about."

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A copolymer comprising ethylene units and propylene units,
    wherein the copolymer has a number average molecular weight of less than 4,000 g/mol as measured by GPC;
    the ethylene content of the copolymer is less than 65 mol %;
    at least 70% of molecules of the copolymer have an unsaturated group, and at least 70% of said unsaturated groups are terminal vinylidene groups of the Formula (I) or a tri-substituted isomer of a terminal vinylidene group of the Formula (II):

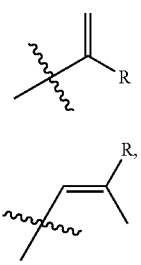

Formula (I)

Formula (II)

wherein R is a methyl group and

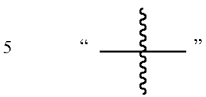

indicates a bond attached to the remaining portion of the copolymer;
    21.4% or less of unit triads in the copolymer are ethylene-ethylene-ethylene triads; and the copolymer has a crossover temperature of −35° C. or lower.

2. The copolymer of claim 1, wherein the copolymer has an average ethylene unit run length of less than 2.6.

3. The copolymer of claim 1, wherein the ethylene content of the copolymer is less than 55 mol %.

4. The copolymer of claim 1, wherein the ethylene content of the copolymer is at least 10 mol % and less than 65 mol %.

5. The copolymer of claim 1, wherein the ethylene content of the copolymer is at least 40 mol % and less than 65 mol %.

6. The copolymer of claim 1, wherein the $C_3$-$C_{10}$ alpha-olefin content of the copolymer is at least 46.2 mol %.

7. The copolymer of claim 1, wherein at least 85 mol % of the copolymer terminates in the terminal vinylidene group or the tri-substituted isomer of the terminal vinylidene group.

8. The copolymer of claim 1, wherein the copolymer has an average ethylene unit run length of less than 2.4.

9. The copolymer of claim 1, wherein the copolymer has an average ethylene unit run length of less than 2.

10. The copolymer of claim 1, wherein the crossover temperature of the copolymer is −40° C. or lower.

11. The copolymer of claim 1, wherein the copolymer has a polydispersity index of less than or equal to 4.

12. The copolymer of claim 1, wherein the copolymer has a polydispersity index of less than or equal to 3.

13. The copolymer of claim 1, wherein the number average molecular weight of the copolymer is from 800 g/mol to less than 4,000 g/mol, as measured by GPC.

14. The copolymer of claim 1, wherein less than 20% of unit triads in the copolymer are ethylene-ethylene-ethylene triads.

15. The copolymer of claim 1, wherein the copolymer has a number average molecular weight less than 3,500 g/mol, as measured by GPC.

16. The copolymer of claim 15, wherein the ethylene content of the copolymer is at least 10 mol % and less than 65 mol %.

17. The copolymer of claim 1, wherein at least 75 mol % of the copolymer terminates in the terminal vinylidene group or the tri-substituted isomer of the terminal vinylidene group.

18. The copolymer of claim 1, wherein at least 95 mol % of the copolymer terminates in the terminal vinylidene group or the tri-substituted isomer of the terminal vinylidene group.

19. The copolymer of claim 1, wherein the copolymer has a number average molecular weight of from 1,000 to 2,500 g/mol, as measured by GPC.

* * * * *